US012737135B2

(12) United States Patent
Cao et al.

(10) Patent No.: US 12,737,135 B2
(45) Date of Patent: Sep. 15, 2026

(54) HYBRID TRIPLE LEVEL CELL PROGRAMMING ALGORITHM FOR ON PITCH SCALING IN BIT COST SCALABLE MEMORY APPARATUSES AND SUB-BLOCK MODE

(71) Applicant: Sandisk Technologies, Inc., Milpitas, CA (US)

(72) Inventors: Wei Cao, Fremont, CA (US); Xiang Yang, Santa Clara, CA (US)

(73) Assignee: Sandisk Technologies, Inc., Milpitas, CA (US)

( * ) Notice: Subject to any disclaimer, the term of this patent is extended or adjusted under 35 U.S.C. 154(b) by 435 days.

(21) Appl. No.: 18/224,477

(22) Filed: Jul. 20, 2023

(65) Prior Publication Data

US 2024/0184468 A1 Jun. 6, 2024

Related U.S. Application Data

(60) Provisional application No. 63/430,260, filed on Dec. 5, 2022.

(51) Int. Cl.
*G06F 3/06* (2006.01)

(52) U.S. Cl.
CPC ............ *G06F 3/064* (2013.01); *G06F 3/0604* (2013.01); *G06F 3/0679* (2013.01)

(58) Field of Classification Search
CPC . G11C 11/5628; G06F 3/064; G06F 3/06064; G06F 3/0679
See application file for complete search history.

(56) References Cited

U.S. PATENT DOCUMENTS

| | | | | |
|---|---|---|---|---|
| 9,496,040 | B2 | 11/2016 | Paudel et al. | |
| 2008/0008006 | A1* | 1/2008 | Goda | G11C 16/0483 365/185.18 |
| 2012/0155166 | A1* | 6/2012 | Li | G11C 11/5628 365/185.03 |
| 2016/0217857 | A1* | 7/2016 | Paudel | G11C 16/10 |
| 2016/0260495 | A1* | 9/2016 | Paudel | G11C 16/26 |
| 2018/0182463 | A1* | 6/2018 | Dutta | G06F 3/0619 |

OTHER PUBLICATIONS

Hong et al., GuardedErase: Extending SSD Lifetimes by Protecting Weak Wordlines, 2022, usenix, 15 pages (Year: 2022).*

* cited by examiner

*Primary Examiner* — Gary W. Cygiel
(74) *Attorney, Agent, or Firm* — Dickinson Wright PLLC

(57) ABSTRACT

A memory apparatus and method of operation are provided. The apparatus includes memory cells each connected to one of a plurality of word lines and disposed in memory holes. The memory cells are configured to retain a threshold voltage corresponding to one of a plurality of data states. A control means is coupled to the plurality of word lines and the memory holes and is configured to identify at least one grouping of the memory cells to be programmed with a multi-pass programming operation. The control means is also configured to program the at least one grouping of the memory cells using the multi-pass programming operation. The control means is additionally configured to program the memory cells other than the at least one grouping of the memory cells in a full sequence programming operation.

20 Claims, 21 Drawing Sheets

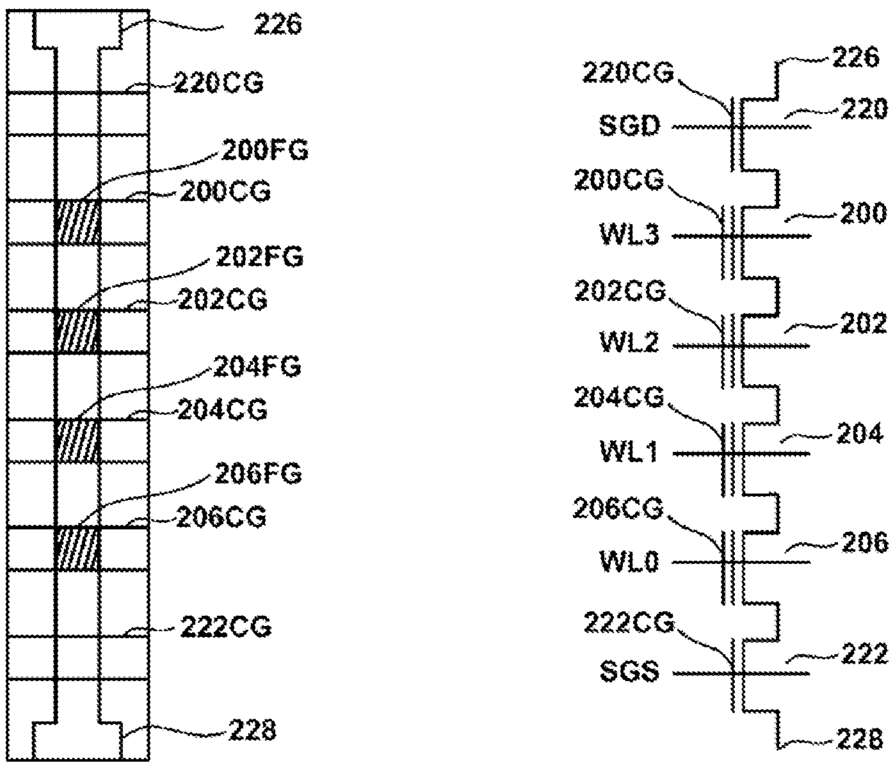
FIG. 2A
FIG. 2B
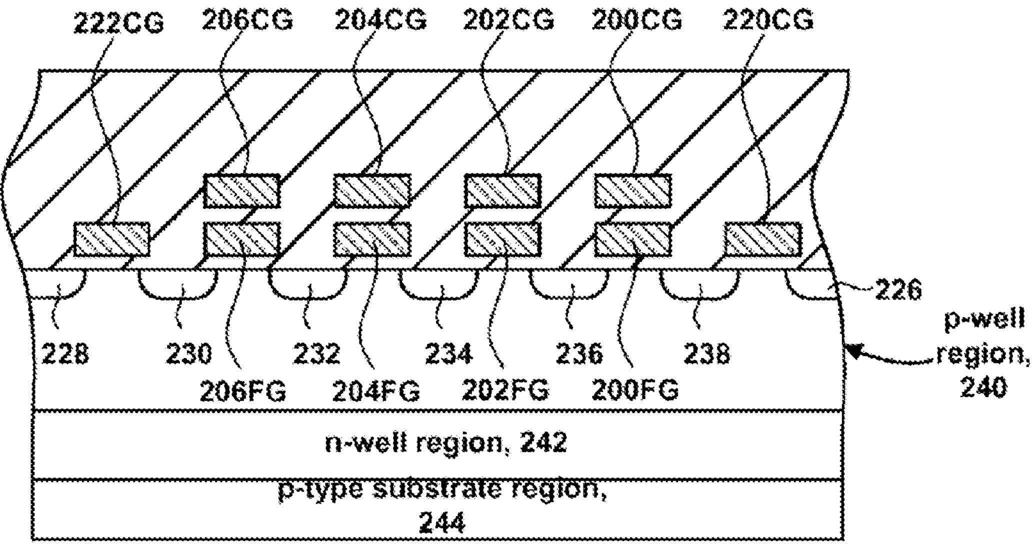
FIG. 3

601 603 605 607 608 610
602
606
NS0-14
C5
C4
C3
C2
C1
C0
C6
C7
C8
C9
C10
C11
620
NS0
604
609
NS1
NS2
NS3
NS4
NS5
y
x 619
624
627
628
629
632
633
637
615
618
623
616
617
621
625
626
609
639
640
641
642
643
645
647
648
653
654
655
657
658
659

Figure 13:
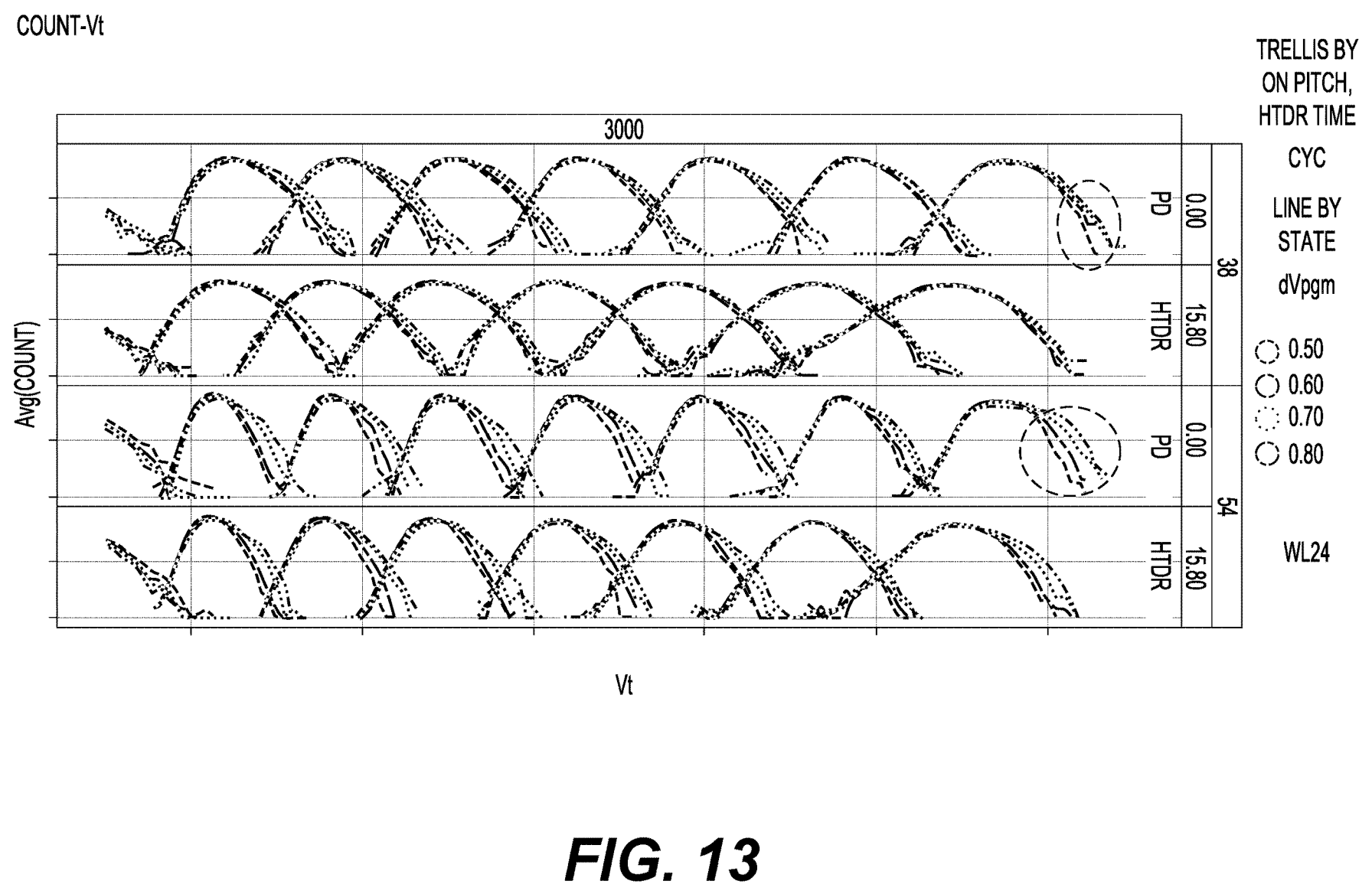

COUNT-Vt

TRELLIS BY ON PITCH, HTDR TIME

CYC

LINE BY STATE dVpgm 0.50
0.60
0.70
0.80

WL24

3000

38

54

0.00

15.80

0.00

15.80

PD

HTDR

PD

HTDR

Avg(COUNT)

HYBRID TRIPLE LEVEL CELL PROGRAMMING ALGORITHM FOR ON PITCH SCALING IN BIT COST SCALABLE MEMORY APPARATUSES AND SUB-BLOCK MODE

CROSS-REFERENCE TO RELATED APPLICATIONS

This application claims the benefit of U.S. Provisional Application No. 63/430,260, filed on Dec. 5, 2022. The entire disclosure of the application referenced above is incorporated herein by reference.

FIELD

This application relates to non-volatile memory apparatuses and the operation of non-volatile memory apparatuses.

BACKGROUND

This section provides background information related to the technology associated with the present disclosure and, as such, is not necessarily prior art.

Semiconductor memory devices or apparatuses have become increasingly popular for use in various electronic devices. For example, non-volatile semiconductor memory is used in cellular telephones, digital cameras, personal digital assistants, mobile computing devices, non-mobile computing devices and other devices. Electrically Erasable Programmable Read Only Memory (EEPROM) and flash memory are among the most popular non-volatile semiconductor memories.

In such memory apparatuses, a memory cell can include a floating gate that is positioned above and insulated from a channel region in a semiconductor substrate, in a two-dimensional (2D) NAND configuration. The floating gate is positioned between source and drain regions. A control gate is provided over and insulated from the floating gate. The threshold voltage (Vth) of the transistor thus formed is controlled by the amount of charge that is retained on the floating gate. That is, the minimum amount of voltage that must be applied to the control gate before the transistor is turned on to permit conduction between its source and drain is controlled by the level of charge on the floating gate. A memory cell can have a floating gate that is used to store two or more ranges of charges, where each range represents a data state.

Moreover, ultra high density storage apparatuses have been proposed using a three-dimensional (3D) stacked memory structure which is formed from an array of alternating conductive and dielectric layers. One example is the Bit Cost Scalable (BiCS) architecture. A memory hole is drilled in the layers, and a NAND string is formed by filling the memory hole with appropriate materials. A straight NAND string extends in one memory hole, while a pipe- or U-shaped NAND string (P-BiCS) includes a pair of vertical columns of memory cells which extend in two memory holes and which are joined by a bottom back gate. Control gates of the memory cells are provided by the conductive layers. However, various challenges are presented in accurately programming such memory apparatuses.

SUMMARY

This section provides a general summary of the present disclosure and is not a comprehensive disclosure of its full scope or all of its features and advantages.

An object of the present disclosure is to provide a memory apparatus and a method of operating the memory apparatus that address and overcome the above-noted shortcomings.

Accordingly, it is an aspect of the present disclosure to provide a memory apparatus including memory cells each connected to one of a plurality of word lines and disposed in memory holes. The memory cells are configured to retain a threshold voltage corresponding to one of a plurality of data states. A control means is coupled to the plurality of word lines and the memory holes and is configured to identify at least one grouping of the memory cells to be programmed with a multi-pass programming operation. The control means is also configured to program the at least one grouping of the memory cells using the multi-pass programming operation. The control means is additionally configured to program the memory cells other than the at least one grouping of the memory cells in a full sequence programming operation.

According to another aspect of the disclosure, a controller in communication with a memory apparatus including memory cells each connected to one of a plurality of word lines and disposed in memory holes is provided. The memory cells are configured to retain a threshold voltage corresponding to one of a plurality of data states. The controller is configured to instruct the memory apparatus to identify at least one grouping of the memory cells to be programmed with a multi-pass programming operation. In addition, the controller is configured to instruct the memory apparatus to program the at least one grouping of the memory cells using the multi-pass programming operation. The controller is also configured to instruct the memory apparatus to program the memory cells other than the at least one grouping of the memory cells in a full sequence programming operation.

According to an additional aspect of the disclosure a method of operating a memory apparatus is provided. The memory apparatus includes memory cells each connected to one of a plurality of word lines and disposed in memory holes. The memory cells are configured to retain a threshold voltage corresponding to one of a plurality of data states. The method includes the step of identifying at least one grouping of the memory cells to be programmed with a multi-pass programming operation. The method continues with the step of programming the at least one grouping of the memory cells using the multi-pass programming operation. The next step of the method is programming the memory cells other than the at least one grouping of the memory cells in a full sequence programming operation.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

FIG. 2A is a top view of an embodiment of a NAND string according to aspects of the disclosure;

FIG. 2B is an equivalent circuit diagram of the NAND string of FIG. 2A according to aspects of the disclosure;

FIG. 3 is a cross-sectional view of the NAND string of FIG. 2A according to aspects of the disclosure;

FIG. 8A depicts a view of the region 774 of FIG. 7C, showing memory cells MC1 to MC5 according to aspects of the disclosure;

FIG. 13 is a plot of threshold voltage distributions for triple-level cells programmed using the plurality of program voltage step sizes for memory cells that have been cycled for power on and high temperature data retention/HTDR according to aspects of the disclosure;

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
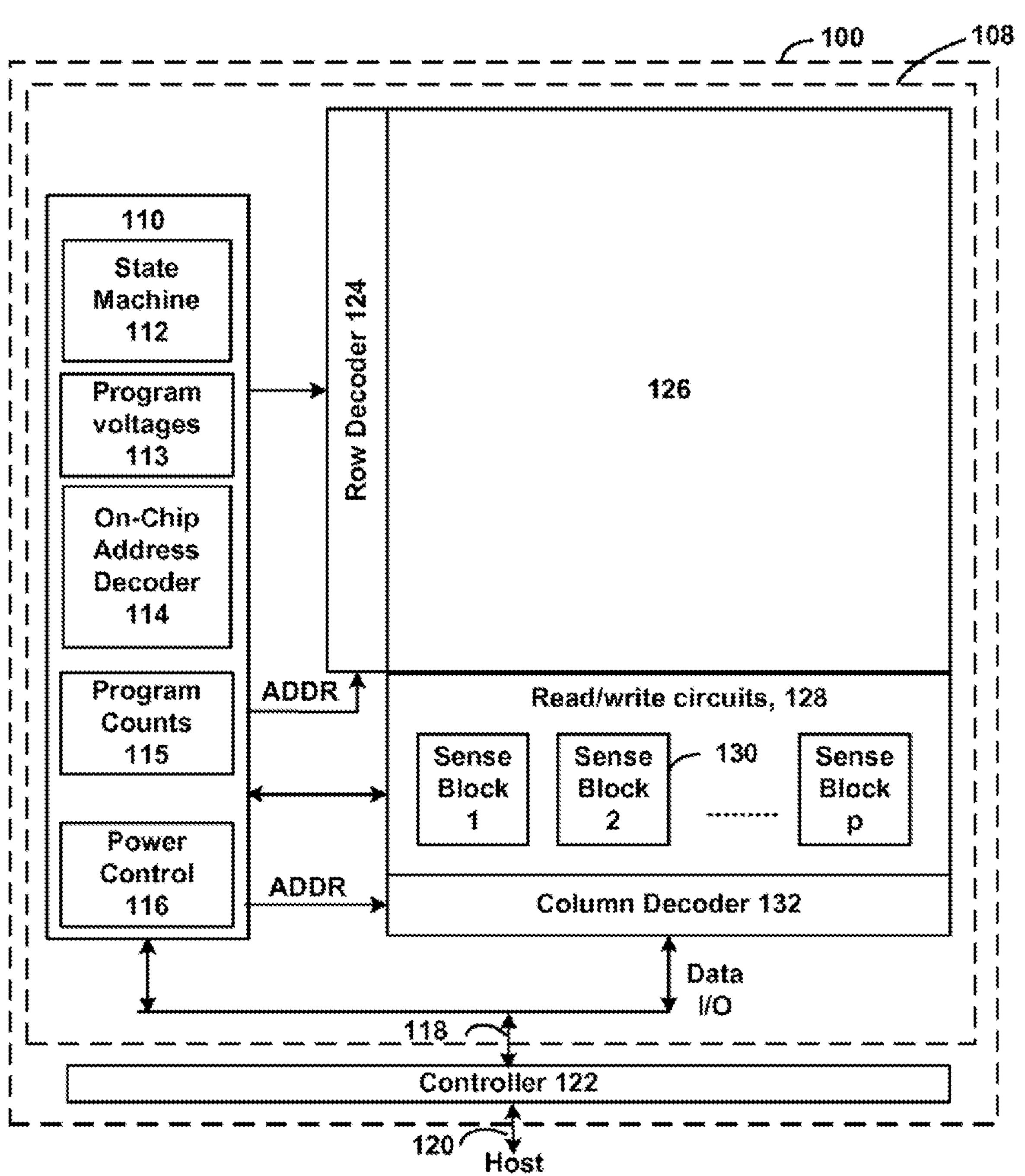
FIG. 1 is a block diagram of an embodiment of a non-volatile memory system according to aspects of the disclosure.

In the following description, details are set forth to provide an understanding of the present disclosure. In some instances, certain circuits, structures and techniques have not been described or shown in detail in order not to obscure the disclosure.

In general, the present disclosure relates to non-volatile memory apparatuses of the type well-suited for use in many applications. The non-volatile memory apparatus and associated methods of operation of this disclosure will be described in conjunction with one or more example embodiments. However, the specific example embodiments disclosed are merely provided to describe the inventive concepts, features, advantages and objectives with sufficient clarity to permit those skilled in this art to understand and practice the disclosure. Specifically, the example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

In some memory devices, memory cells are joined to one another such as in NAND strings in a block or sub-block. Each NAND string comprises a number of memory cells connected in series between one or more drain-side SG transistors (SGD transistors), on a drain-side of the NAND string which is connected to a bit line, and one or more source-side SG transistors (SGS transistors), on a source-side of the NAND string which is connected to a source line. Further, the memory cells can be arranged with a common control gate line (e.g., word line) which acts a control gate. A set of word lines extends from the source side of a block to the drain side of a block. Memory cells can be connected in other types of strings and in other ways as well.

The memory cells can include data memory cells, which are eligible to store user data, and dummy or non-data memory cells which are ineligible to store user data. A dummy word line is connected to a dummy memory cell. One or more dummy memory cells may be provided at the drain and/or source ends of a string of memory cells to provide a gradual transition in channel gradient.

During a programming operation, the memory cells are programmed according to a word line programming order. For example, the programming may start at the word line at the source side of the block and proceed to the word line at the drain side of the block. In one approach, each word line is completely programmed before programming a next word line. For example, a first word line, WL0, is programmed using one or more programming passes until the programming is completed. Next, a second word line, WL1, is programmed using one or more programming passes until the programming is completed, and so forth. A programming pass may include a set of increasing program voltages which are applied to the word line in respective program loops or program-verify iterations, such as depicted in FIG. 10F. Verify operations may be performed after each program voltage to determine whether the memory cells have completed programming. When programming is completed for a memory cell, it can be locked out from further programming while programming continues for other memory cells in subsequent program loops.

The memory cells may also be programmed according to a sub-block programming order, where memory cells in one sub-block, or portion of a block, are programmed before programming memory cells in another sub-block.

Each memory cell may be associated with a data state according to write data in a program command. Based on its data state, a memory cell will either remain in the erased state or be programmed to a programmed data state. For example, in a one bit per cell memory device, there are two data states including the erased state and the programmed state. In a two-bit per cell memory device, there are four data states including the erased state and three higher data states referred to as the A, B and C data states (see FIG. 10A). In a three-bit per cell memory device, there are eight data states including the erased state and seven higher data states referred to as the A, B, C, D, E, F and G data states. In a four-bit per cell memory device, there are sixteen data states including the erased state and fifteen higher data states. The data states may be referred to as the S0, S1, S2, S3, S4, S5, S6, S7, S8, S9, S10, S11, S12, S13, S14 and S15 data states where S0 is the erased state.

After the memory cells are programmed, the data can be read back in a read operation. A read operation can involve applying a series of read voltages to a word line while sensing circuitry determines whether cells connected to the word line are in a conductive or non-conductive state. If a cell is in a non-conductive state, the Vth of the memory cell exceeds the read voltage. The read voltages are set at levels which are expected to be between the threshold voltage levels of adjacent data states.

As development such memory devices apparatuses advance, the pitch scaling or spacing between word lines in a stack may be reduced. Such reduction of spacing between the word lines advantageously allows smaller more compact memory apparatuses; however, reducing the spacing can also introduce decreases in threshold voltage Vt budget.

FIG. 1 is a block diagram of a non-volatile memory system 100, which may include one or more memory die 108. Memory die 108 includes a memory structure 126 of memory cells, control circuitry 110, and read/write circuits 128. Memory structure 126 is addressable by word lines via a row decoder 124 and by bit lines via a column decoder 132. Read/write circuits 128 include multiple sense blocks 130 (sensing circuitry) and allow a page of memory cells to be read or programmed in parallel. Typically a controller 122 is included in the same memory device 100 (e.g., a removable storage card) as the one or more memory die 108. Commands and data are transferred between a host and controller 122 via lines 120 and between controller 122 and the one or more memory die 108 via lines 118.

Memory structure 126 may include one or more arrays of memory cells including a 2D array and/or a 3D array, as described in more detail below. In some embodiment, memory structure 126 may include a monolithic 3D memory array in which multiple memory levels are formed above (and not in) a single substrate, such as a wafer, with no intervening substrates. Memory structure 126 may include any type of non-volatile memory that is monolithically formed in one or more physical levels of arrays of memory cells having an active area disposed above a silicon substrate. Memory structure 126 may be in a non-volatile memory device having circuitry associated with the operation of the memory cells, whether the associated circuitry is above or within the substrate.

Control circuitry 110 cooperates with read/write circuits 128 to perform memory operations on memory structure 126, and includes a state machine 112, an on-chip address decoder 114, and a power control module 116. State machine 112 provides chip-level control of memory operations. A storage region 113 may be provided for program voltages in the memory device, such as Vpgm voltage values to be used in one or more programming passes. A storage location 115 such as a data register can be used to store data for programming, such as a number of program pulses applied to a memory cell.

On-chip address decoder 114 provides an address interface between that used by the host or a memory controller to the hardware address used by decoders 124 and 132. Power control module 116 controls the power and voltages supplied to the word lines and bit lines during memory operations. Power control module 116 may include drivers for word line layers (WLLs) in a 3D configuration, SGS and SGD transistors and source lines. Sense blocks 130 can include bit line drivers, in one approach. An SGS transistor is a select gate transistor at a source end of a NAND string, and an SGD transistor is a select gate transistor at a drain end of a NAND string.

In some implementations, some of the components can be combined. In various designs, one or more of the components (alone or in combination), other than memory structure 126, can be thought of as at least one control circuit which is configured to perform the actions described herein. For example, a control circuit may include any one of, or a combination of, control circuitry 110, state machine 112, decoders 114/132, power control module 116, sense blocks 130, read/write circuits 128, and controller 122, and so forth.

Other types of non-volatile memory in addition to NAND flash memory can also be used.

Semiconductor memory devices include volatile memory devices, such as dynamic random access memory ("DRAM") or static random access memory ("SRAM") devices, non-volatile memory devices, such as resistive random access memory ("ReRAM"), electrically erasable programmable read only memory ("EEPROM"), flash memory (which can also be considered a subset of EEPROM), ferroelectric random access memory ("FRAM"), and magnetoresistive random access memory ("MRAM"), and other semiconductor elements capable of storing information. Each type of memory device may have different configurations. For example, flash memory devices may be configured in a NAND or a NOR configuration.

Memory devices can be formed from passive and/or active elements, in any combinations. By way of non-limiting example, passive semiconductor memory elements include ReRAM device elements, which in some embodiments include a resistivity switching storage element, such as an anti-fuse or phase change material, and optionally a steering element, such as a diode or transistor. Further by way of non-limiting example, active semiconductor memory elements include EEPROM and flash memory device elements, which in some embodiments include elements containing a charge storage region, such as a floating gate, conductive nanoparticles, or a charge storage dielectric material.

Multiple memory elements may be configured so that they are connected in series or so that each element is individually accessible. By way of non-limiting example, flash memory devices in a NAND configuration (NAND memory) typically contain memory elements connected in series. A NAND memory array may be configured so that the array is composed of multiple strings of memory in which a string is composed of multiple memory elements sharing a single bit line and accessed as a group. Alternatively, memory elements may be configured so that each element is individually accessible, e.g., a NOR memory array. NAND and NOR memory configurations are exemplary, and memory elements may be otherwise configured.

The semiconductor memory elements located within and/or over a substrate may be arranged in two or three dimensions, such as a 2D memory structure or a 3D memory structure.

In a 2D memory structure, the semiconductor memory elements are arranged in a single plane or a single memory device level. Typically, in a two dimensional memory structure, memory elements are arranged in a plane (e.g., in an x-y direction plane) which extends substantially parallel to a major surface of a substrate that supports the memory elements. The substrate may be a wafer over or in which the layer of the memory elements are formed or it may be a carrier substrate which is attached to the memory elements after they are formed. As a non-limiting example, the substrate may include a semiconductor such as silicon.

The memory elements may be arranged in the single memory device level in an ordered array, such as in a plurality of rows and/or columns. However, the memory elements may be arrayed in non-regular or non-orthogonal configurations. The memory elements may each have two or more electrodes or contact lines, such as bit lines and word lines.

FIG. 2A is a top view showing of an example 2D NAND string, and FIG. 2B is an equivalent circuit thereof. The 2D NAND string depicted includes four transistors 200, 202, 204 and 206 in series and sandwiched between a first select gate 220 and a second select gate 222. Select gate 220 connects the NAND string to bit line 226. Select gate 222 connects the NAND string to source line 228. Select gate 220 is controlled by applying the appropriate voltages to control gate 220CG. Select gate 222 is controlled by applying the appropriate voltages to control gate 222CG.

Each of transistors 200, 202, 204 and 206 has a control gate and a floating gate. Transistor 200 has control gate 200CG and floating gate 200FG. Transistor 202 includes control gate 202CG and floating gate 202FG. Transistor 204 includes control gate 204CG and floating gate 204FG. Transistor 206 includes a control gate 206CG and floating gate 206FG. Control gate 200CG is connected to word line WL3, control gate 202CG is connected to word line WL2, control gate 204CG is connected to word line WL1, and control gate 206CG is connected to word line WL0.

In an embodiment, transistors 200, 202, 204 and 206 are each memory cells. In other embodiments, the memory cells may include multiple transistors or may be different than that depicted. Select gate 220 is connected to select line SGD. Select gate 222 is connected to select line SGS.

FIG. 3 provides a cross-sectional view of the NAND string described above. The transistors of the NAND string are formed in p-well region 240. The p-well region in turn may be within an n-well region 242 of a p-type substrate 244. Each transistor includes a stacked gate structure that consists of a control gate (200CG, 202CG, 204CG and 206CG) and a floating gate (200FG, 202FG, 204FG and 206FG). The floating gates are formed on the surface of the p-well on top of an oxide or other dielectric film. The control gate is above the floating gate, with an inter-polysilicon dielectric layer separating the control gate and floating gate.

The control gates of the memory cells (200, 202, 204 and 206) form the word lines. N+ doped layers 230, 232, 234, 236 and 238 are shared between neighboring cells, whereby the cells are connected to one another in series to form a NAND string. These N+ doped layers form the source and drain of each of the cells.

For example, N+ doped layer 230 serves as the drain of transistor 222 and the source for transistor 206, N+ doped layer 232 serves as the drain for transistor 206 and the source for transistor 204, N+ doped layer 234 serves as the drain for transistor 204 and the source for transistor 202, N+ doped layer 236 serves as the drain for transistor 202 and the source for transistor 200, and N+ doped layer 238 serves as the drain for transistor 200 and the source for transistor 220. N+ doped layer 226 connects to the bit line for the NAND string, while N+ doped layer 228 connects to a common source line for multiple NAND strings.

Note that although FIGS. 2A, 2B and 3 show four memory cells in the NAND string, a NAND string used with the technology described herein can have fewer than four memory cells or more than four memory cells. For example, some NAND strings will include 8, 16, 32 or more memory cells.

Figure 4:
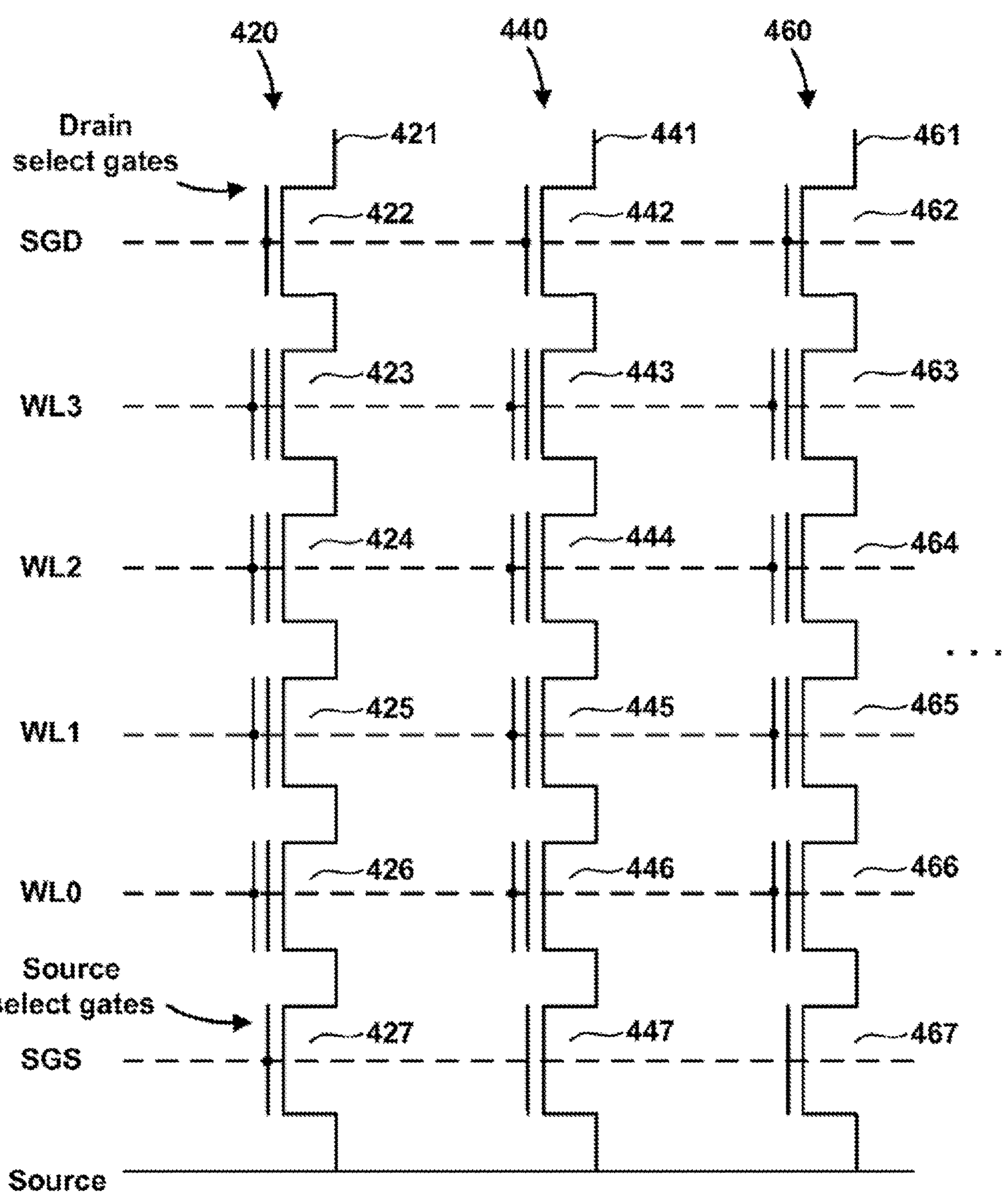
FIG. 4 is a circuit diagram depicting an embodiment of three NAND strings according to aspects of the disclosure.

FIG. 4 is a circuit diagram depicting three NAND strings. A typical architecture for a flash memory system using a NAND structure will include several NAND strings. For example, three NAND strings 420, 440 and 460 are shown in a memory array having many more NAND strings. Each of the NAND strings includes two select gates and four memory cells. Although four memory cells are illustrated for simplicity, modern NAND strings can have up to thirty-two or sixty-four memory cells, for instance.

For example, NAND string 420 includes select gates 422 and 427, and memory cells 423-426, NAND string 440 includes select gates 442 and 447, and memory cells 443-446, NAND string 460 includes select gates 462 and 467, and memory cells 463-466. Each NAND string is connected to the source line by its select gates (e.g., select gates 427, 447 or 467). A selection line SGS is used to control the source side select gates.

The various NAND strings 420, 440 and 460 are connected to respective bit lines 421, 441 and 461, by select transistors in the select gates 422, 442, 462, respectively. These select transistors are controlled by a drain select line SGD. In other embodiments, the select lines do not necessarily need to be in common among the NAND strings. That is, different select lines can be provided for different NAND strings.

Word line WL3 is connected to the control gates for memory cells 423, 443 and 463. Word line WL2 is connected to the control gates for memory cells 424, 444 and 464. Word line WL1 is connected to the control gates for memory cells 425, 445 and 465. Word line WL0 is connected to the control gates for memory cells 426, 446 and 466. As can be seen, each bit line and the respective NAND string comprise the columns of the array or set of memory cells. The word lines (WL3, WL2, WL1 and WL0) comprise the rows of the array or set.

Each word line connects the control gates of each memory cell in the row. Or, the control gates may be provided by the word lines themselves. For example, word line WL2 provides the control gates for memory cells 424, 444 and 464. In practice, there can be thousands of memory cells on a word line.

When programming a flash memory cell, a program voltage, usually a series of voltage pulses, is applied to the control gate of the memory cell, and the bit line associated with the memory cell is grounded. Electrons from the channel are injected into the floating gate. When electrons accumulate in the floating gate, the floating gate becomes negatively charged and the Vth of the memory cell is raised. To apply the program voltage to the control gate of the memory cell being programmed, that program voltage is applied on the appropriate word line. As discussed above, one memory cell in each of the NAND strings share the same word line. For example, when programming memory cell 424 of FIG. 4, the program voltage will also be applied to the control gates of memory cells 444 and 464.

However, program disturb can occur at inhibited NAND strings during programming of other NAND strings, and sometimes at the programmed NAND string itself. Program disturb occurs when the Vth of an unselected non-volatile memory cell is shifted due to programming of other non-volatile memory cells. Program disturb can occur on previously programmed memory cells as well as erased memory cells that have not yet been programmed. Various program disturb mechanisms can limit the available operating window for non-volatile storage devices such as NAND flash memory.

For example, if NAND string 420 is inhibited (e.g., it is an unselected NAND string which does not contain a memory cell which is currently being programmed) and NAND string 440 is being programmed (e.g., it is a selected NAND string which contains a memory cell which is currently being programmed), program disturb can occur at NAND string 420. For example, if a pass voltage is low, the channel of the inhibited NAND string is not well boosted, and a selected word line of the unselected NAND string can be unintentionally programmed. In another possible scenario, the boosted voltage can be lowered by Gate Induced Drain Leakage (GIDL) or other leakage mechanisms, resulting in the same problem. Other effects, such as shifts in the Vth of a charge memory cell due to capacitive coupling with other neighboring memory cells that are programmed later, can also contribute to program disturb.

Each memory cell can store data represented in analog or digital form. When storing one bit of digital data, the range of possible threshold voltages of the memory cell is divided into two ranges, which are assigned logical data "1" and "0." In an example of a NAND-type flash memory, the Vth is negative after the memory cell is erased, and defined as logic "1." The Vth is positive after a program operation, and defined as logic "0." When the Vth is negative and a read is attempted by applying 0 volts to the control gate, the memory cell will turn on to indicate logic one is being stored. When the Vth is positive and a read operation is attempted by applying 0 volts to the control gate, the memory cell will not turn on, which indicates that logic zero is stored.

A memory cell can also store multiple states, thereby storing multiple bits of digital data. In the case of storing multiple states of data, the Vth window is divided into the number of states. For example, if four states are used, there will be four Vth ranges assigned to the data values "11," "10," "01," and "00." In an example of a NAND-type memory, the Vth after an erase operation is negative and defined as "11." Positive threshold voltages are used for the states of "10," "01," and "00." In other embodiments, positive threshold voltages are used for all memory states.

In some implementations, the data values (e.g., logical states) are assigned to the threshold ranges using a Gray code assignment so that if the Vth of a floating gate erroneously shifts to its neighboring physical state, only one bit will be affected. The specific relationship between the data programmed into the memory cell and the Vth ranges of the cell depends upon the data encoding scheme adopted for the memory cells.

Other types of non-volatile memory in addition to NAND flash memory can also be used.

Another type of memory cell useful in flash EEPROM systems utilizes a non-conductive dielectric material in place of a conductive floating gate to store charge in a non-volatile manner. A triple layer dielectric formed of silicon oxide, silicon nitride and silicon oxide ("ONO") is sandwiched between a conductive control gate and a surface of a semi-conductive substrate above the memory cell channel. The cell is programmed by injecting electrons from the cell channel into the nitride, where they are trapped and stored in a limited region. This stored charge then changes the Vth of a portion of the channel of the cell in a manner that is detectable. The cell is erased by injecting hot holes into the nitride. A similar cell can be provided in a split-gate configuration where a doped polysilicon gate extends over a portion of the memory cell channel to form a separate select transistor.

In another approach, two bits are stored in each NROM cell, where an ONO dielectric layer extends across the channel between source and drain diffusions. The charge for one data bit is localized in the dielectric layer adjacent to the drain, and the charge for the other data bit localized in the dielectric layer adjacent to the source. Multi-state data storage is obtained by separately reading binary states of the spatially separated charge storage regions within the dielectric.

As mentioned above, memory structure 126 of FIG. 1 also may include a 3D memory array. A 3D memory array is arranged so that memory elements occupy multiple planes or multiple memory device levels, thereby forming a structure in three dimensions (i.e., in the x, y and z directions, where the z direction is substantially perpendicular and the x and y directions are substantially parallel to the major surface of the substrate).

As a non-limiting example, a 3D memory structure may be vertically arranged as a stack of multiple two dimensional memory device levels. As another non-limiting example, a 3D memory array may be arranged as multiple vertical columns (e.g., columns extending substantially perpendicular to the major surface of the substrate, i.e., in the z-direction) with each column having multiple memory elements. The columns may be arranged in a two dimensional configuration, e.g., in an x-y plane, resulting in a three dimensional arrangement of memory elements with elements on multiple vertically stacked memory planes. Other configurations of memory elements in three dimensions can also constitute a 3D memory array.

By way of non-limiting example, in a 3D NAND memory array, the memory elements may be coupled together to form a NAND string within a single horizontal (e.g., x-y) memory device level. Alternatively, the memory elements may be coupled together to form a vertical NAND string that traverses across multiple horizontal memory device levels. Other three dimensional configurations can be envisioned wherein some NAND strings contain memory elements in a single memory level while other strings contain memory elements which span through multiple memory levels. 3D memory arrays may also be designed in a NOR configuration and in a ReRAM configuration.

Typically, in a monolithic 3D memory array, one or more memory device levels are formed above a single substrate. Optionally, the monolithic 3D memory array may also have one or more memory layers at least partially within the single substrate. As a non-limiting example, the substrate may include a semiconductor such as silicon. In a monolithic 3D array, the layers constituting each memory device level of the array are typically formed on the layers of the underlying memory device levels of the array. However, layers of adjacent memory device levels of a monolithic 3D memory array may be shared or have intervening layers between memory device levels.

Then again, two dimensional arrays may be formed separately and then packaged together to form a non-monolithic memory device having multiple layers of memory. For example, non-monolithic stacked memories can be constructed by forming memory levels on separate substrates and then stacking the memory levels atop each other. The substrates may be thinned or removed from the memory device levels before stacking, but as the memory device levels are initially formed over separate substrates, the resulting memory arrays are not monolithic 3D memory arrays. Further, multiple 2D memory arrays or 3D memory arrays (monolithic or non-monolithic) may be formed on separate chips and then packaged together to form a stacked-chip memory device.

Associated circuitry is typically required for operation of the memory elements and for communication with the memory elements. As non-limiting examples, memory devices may have circuitry used for controlling and driving memory elements to accomplish functions such as programming and reading. This associated circuitry may be on the same substrate as the memory elements and/or on a separate substrate. For example, a controller for memory read-write operations may be located on a separate controller chip and/or on the same substrate as the memory elements.

One of skill in the art will recognize that this technology is not limited to the 2D and 3D exemplary structures described but covers all relevant memory structures within the spirit and scope of the technology as described herein and as understood by one of skill in the art.

Figure 5:
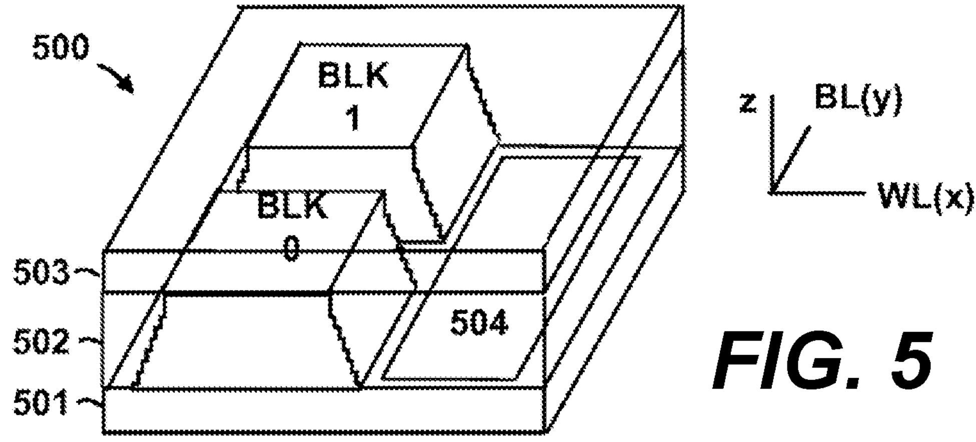
FIG. 5 is a perspective view of a 3D stacked non-volatile memory device according to aspects of the disclosure.

FIG. 5 is a perspective view of an embodiment of a 3D stacked non-volatile memory device. The memory device 100 includes a substrate 101. On substrate 101 are example blocks BLK0 and BLK1 of memory cells and a peripheral area 104 with circuitry for use by the blocks. Substrate 101 also can carry circuitry under blocks BLK0 and BLK1, along with one or more lower metal layers which are patterned in conductive paths to carry signals of the circuitry. Blocks BLK0 and BLK1 are formed in an intermediate region 102 of memory device 100. In an upper region 103 of memory device 100, one or more upper metal layers are patterned in conductive paths to carry signals of the circuitry.

Blocks BLK0 and BLK1 each include a stacked area of memory cells, where alternating levels of the stack represent word lines. In one possible approach, each block has opposing tiered sides from which vertical contacts extend upward to an upper metal layer to form connections to conductive paths. Although two blocks BLK0 and BLK1 are depicted as an example, additional blocks can be used, extending in the x- and/or y-directions.

In one possible approach, the length of the plane, in the x-direction, represents a direction in which signal paths to word lines extend in the one or more upper metal layers (a word line direction), and the width of the plane, in the y-direction, represents a direction in which signal paths to bit lines extend in the one or more upper metal layers (a bit line direction). The z-direction represents a height of the memory device.

Figures 6A, 6B:
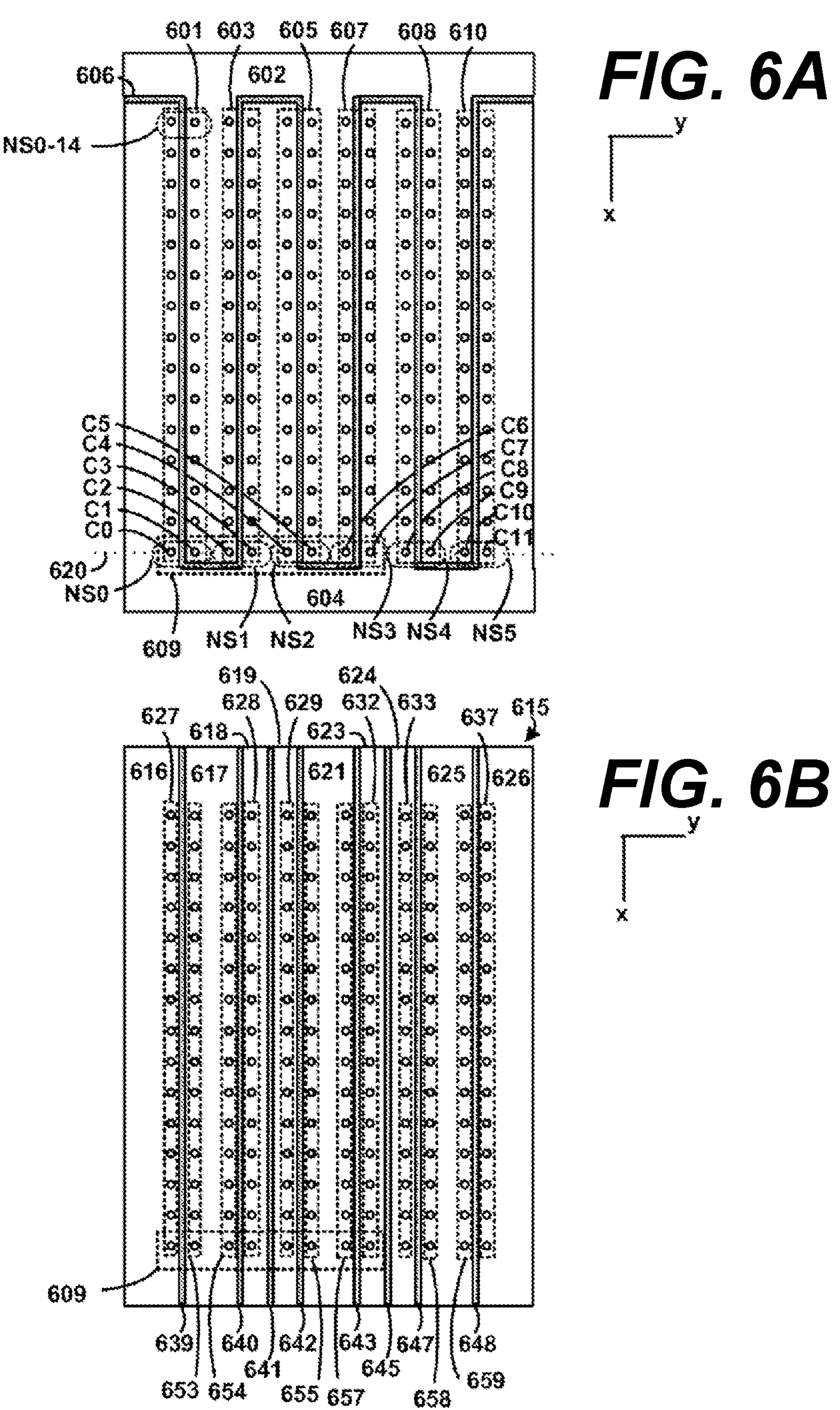
FIGS. 6A-6C depict various view of a U-shaped NAND embodiment, as an example implementation of BLK0 in FIG. 5 according to aspects of the disclosure.

FIG. 6A depicts a top view of example word line layers 602 and 604 in a U-shaped NAND embodiment, as an example implementation of BLK0 in FIG. 5. In a 3D stacked memory device, memory cells are formed along memory holes which extend through alternating conductive and dielectric layers in a stack. The memory cells are typically arranged in NAND strings. Each conductive layer can include one or more word line layers. A word line layer is an example of a word line.

Figure 6C:
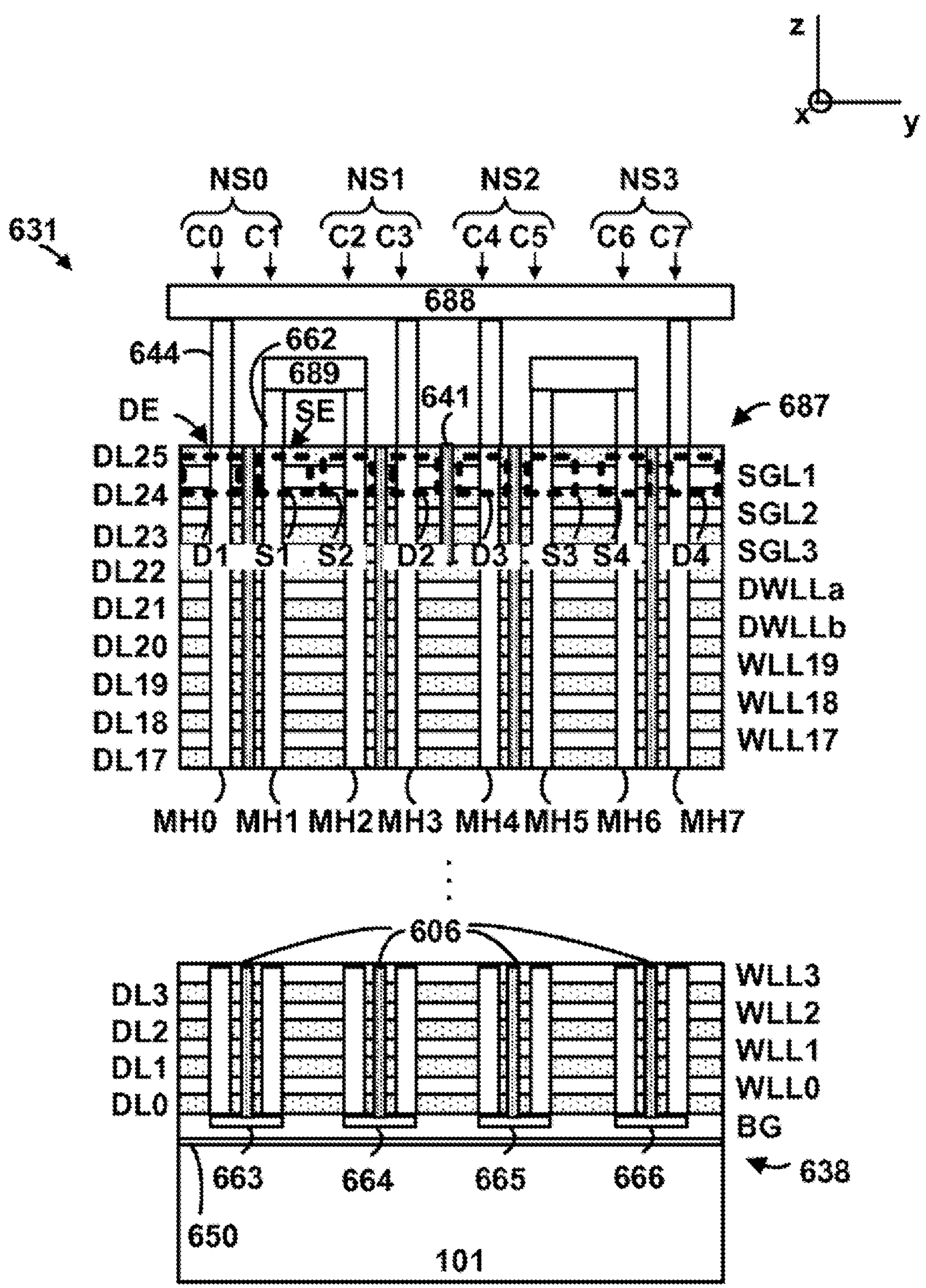

The view is of a representative layer among the multiple WLLs in a stack. Referring also to FIG. 6C, the stack includes alternating dielectric and conductive layers. The dielectric layers include DL0 to DL25 and may be made of $SiO_2$, for instance. The conductive layers include a back gate layer (BGL), data-storing word line layers WLL0 to WLL19, dummy (non-data-storing) word line layers DWLLa and DWLLb, and select gate layers SGL1, SGL2 and SGL3. The word line layers are conductive paths to control gates of the memory cells at the layer. Moreover, each select gate layer may comprises conductive lines to select gate transistors (e.g., SGD and/or SGS transistors).

The word line layers of FIG. 6A may represent any one of the word line layers in FIG. 6C. These conductive layers may include doped polysilicon, metal such as tungsten or metal silicide, for instance. An example voltage of 5-10 V may be applied to the back gate to maintain a conductive state which connects the drain- and source-side columns.

For each block, each conductive layer may be divided into two word line layers 602 and 604 which are insulated from one another by a slit 606. The slit is formed by etching a void which extends vertically in the stack, typically from an etch stop layer at the bottom to at least a top layer of the stack, then filling the slit with insulation. This is an example of the type of etching which can result in the accumulation of charges in the top conductive layer of the stack. The slit 606 is a single continuous slit which extends in a zig-zag pattern in the block. This approach can provide greater flexibility in controlling the memory cells since the WLLs can be driven independently.

Each block includes memory holes or pillars which extend vertically in the stack, and comprise a column of memory cells such as in a NAND string. Each circle represents a memory hole or a memory cell associated with the word line layer. Example columns of memory cells along a line 620 include C0 to C11. Columns C0, C3, C4, C7, C8 and C11 represent the drain side columns of respective NAND strings. Columns C1, C2, C5, C6, C9 and C10 represent the source side columns of respective NAND strings. The figure represents a simplification, as many more rows of memory holes will typically be used, extending to the right and left in the figure. Also, the figures are not necessarily to scale. The columns of memory cells can be arranged in subsets such as sub-blocks.

Further, the NAND strings are arranged in sets, where each NAND string in a set has an SGD transistor with a common control gate voltage. See also FIG. 6B. Regions 601, 603, 605, 607, 608 and 610 each represent a set of NAND strings, or a set of memory cells in a word line layer. For example, region 610 includes NAND strings NS0, . . . , NS0-14. A programming operation can involve one set of NAND strings. Each NAND string in a set can be associated with a respective bit line which is independently controlled to allow or inhibit programming.

The drawings are not to scale and do not show all memory columns. For example, a more realistic block might have twelve memory columns in the y direction as shown, but a very large number such as 32,000 memory columns in the x direction, for a total of 384,000 memory columns in a block. With U-shaped NAND strings, 192,000 NAND strings are provided in this example. With straight NAND strings, 384,000 NAND strings are provided in this example. Assuming there are twenty-four memory cells per column, there are 384,000×24=9,216,000 memory cells in the set.

FIG. 6B depicts a top view of example select gate layer portions, consistent with FIG. 6A. In one approach, the select gate layer 615 is different than a WLL in that a separate SGD layer portion or line, is provided for each set of NAND strings. That is, each single row of SGD transistors extending in the x direction is separately controlled. In other words, the control gates of the SGD transistors in each set of NAND strings are commonly controlled.

Further, an SGS layer portion or line is provided for a pair of rows of SGS transistors extending in the x direction, in one approach, for adjacent sets of NAND strings. Optionally, additional slits are used so that a separate SGS layer portion is provided for a single row of SGS transistors extending in the x direction. Thus, the control gates of the SGS transistors in a pair of rows of SGS transistors, or in a single row of SGS transistors, are also commonly controlled.

The SGS and SGD layer portions are created due to slits 639, 640, 641, 642, 643, 645, 647 and 648. The slits extend partway down in the stack as depicted by example slit 641 in FIG. 6C. Regions 627, 628, 629, 632, 633 and 637 represent SGD transistors in SGD layer portions 616, 618, 619, 623, 624 and 626, respectively. Regions 653 and 654, 655 and 657, and 658 and 659 represent SGS transistors in SGS layer portions 617, 621 and 625, respectively. Regions 655 and 657, 658 and 659, represent SGS transistors in SGS layer portions 621 and 625, respectively. The portion 609 from FIG. 6A is repeated for reference.

The select gate transistors are associated with NAND strings NS0-NS5.

FIG. 6C depicts an embodiment of a stack 631 showing a cross-sectional view of the portion 609 of FIG. 6A, along line 620. This example includes three select gate layers, SGL1, SGL2 and SGL3. In this case, the slit extends down to DL22, so that three separate layers of select gate transistors are formed in each column of each NAND string. The stack has a top 687 and a bottom 238.

The conductive layers of the select gates can have a same height (channel length) as the conductive layers of the memory cells, in one approach. This facilitates the fabrication of the memory device. In a column, the individual select gate transistors together are equivalent to one select gate transistor having a channel length which is the sum of the channel lengths of the individual select gate transistors. Further, in one approach, select gate transistors in a column (e.g., in layers SGL1, SGL2 and SGL3) are connected and received a common voltage during operations. The SGS transistors can have a similar construction as the SGD transistors. Further, the SGS and SGD transistors can have a similar construction as the memory cell transistors.

The substrate may be p-type and can provide a ground which is connected to the top select gate layer, in one approach. A via 644 connects a drain side of C0 and NS0 to a bit line 688. A via 662 connects a source side of C1 and NS0 to a source line 689. Back gates 663, 664, 665 and 666 are provided in NS0, NS1, NS2 and NS3, respectively.

Regions D1, D2, D3 and D4 represent SGD transistors and regions S1, S2, S3 and S4 represent SGS transistors, in SGL1.

Figure 7A:
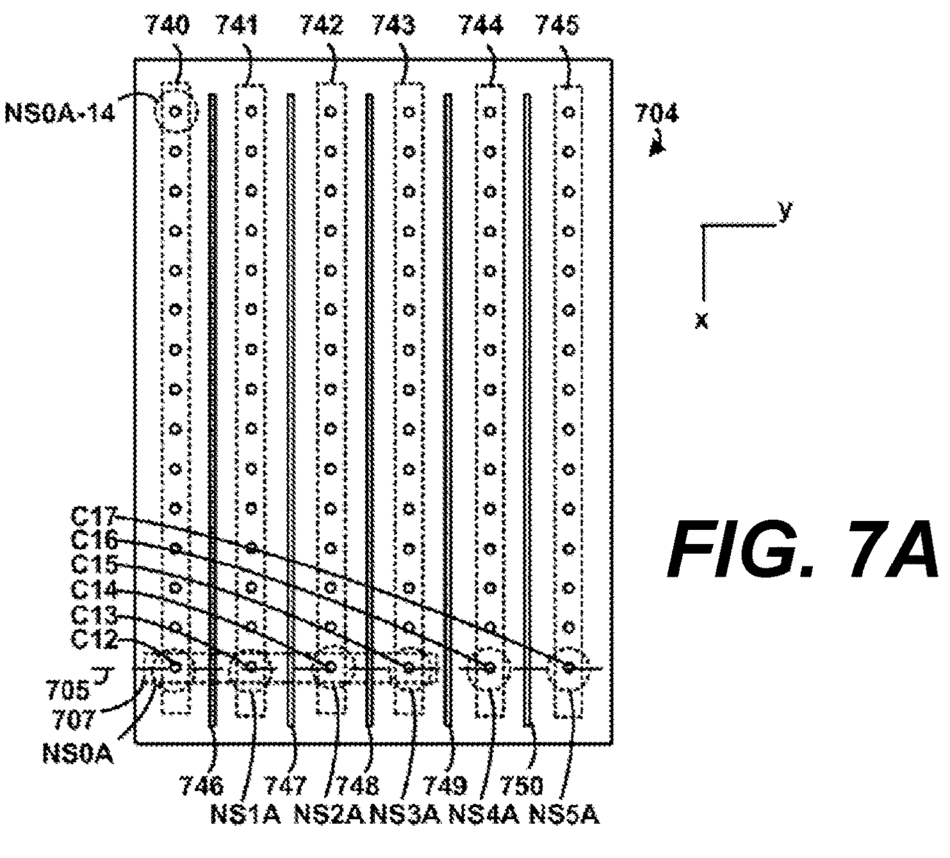
FIGS. 7A-7C depict various views of a straight NAND string embodiment, as an example word line layer of block BLK0 of FIG. 5 according to aspects of the disclosure.

FIG. 7A depicts a top view of an example word line layer 704 of the block BLK0 of FIG. 5, in a straight NAND string embodiment. In this configuration, a NAND string has only one column, and the source-side select gate is on the bottom of the column instead of on the top, as in a U-shaped NAND string. Moreover, a given level of a block has one WLL which is connected to each of the memory cells of the layer. Insulation-filled slits 746, 747, 748, 749 and 750 can also be used in the fabrication process to provide structural support for the stack when undoped polysilicon layers are removed by a wet etch and a dielectric is deposited to form the alternating dielectric layers. A dashed line 705 extends through columns C12-C17. A cross-sectional view along line 705 of portion 707 is shown in FIG. 7C.

Regions 740, 741, 742, 743, 744 and 745 represent the memory cells (as circles) of respective sets of NAND strings. For example, region 740 represents memory cells in NAND strings NS0A, NS0A-14. Additional NAND strings include NS1A, NS2A, NS3A, NS4A and NS5A.

Alternatively, the layer 704 represents an SGS layer, in which case each circle represents an SGS transistor.

Figure 7B:
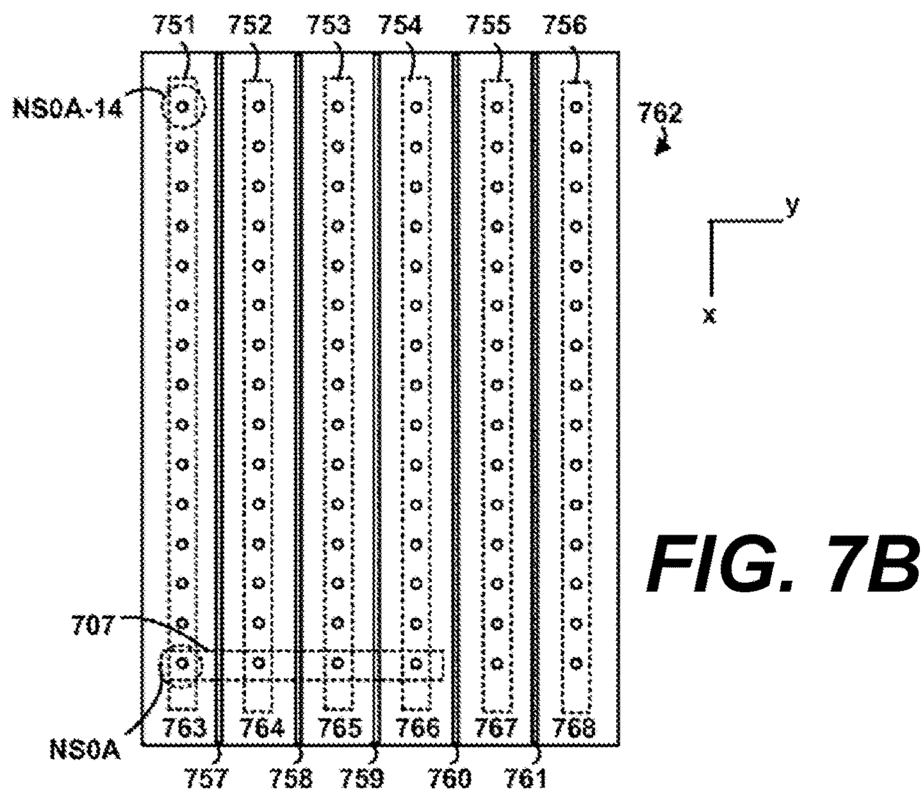
Figure 7C:
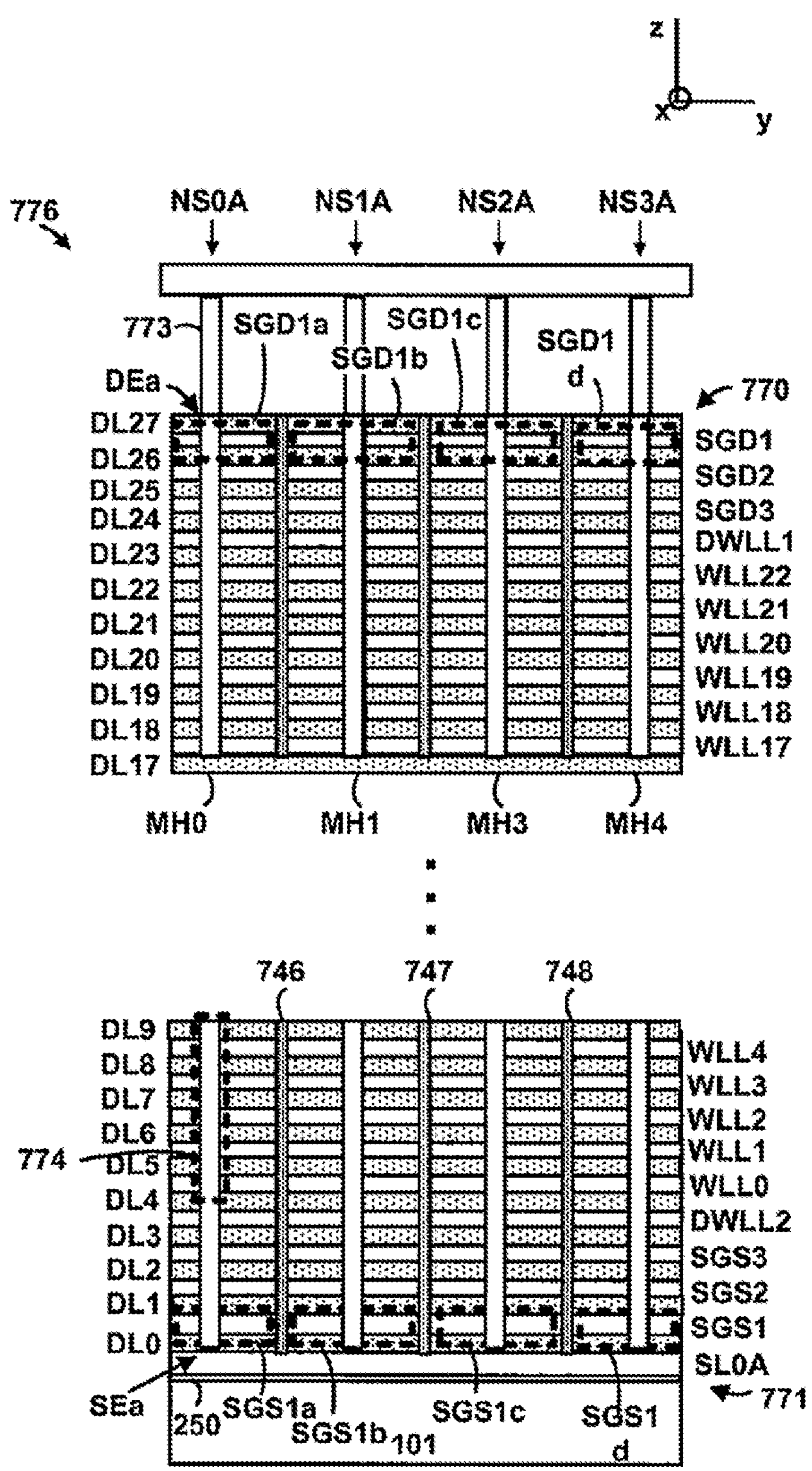

FIG. 7B depicts a top view of an example SGD layer 762, consistent with FIG. 7A. Slits 757, 758, 759, 760 and 761 divide the SGD layer into portions 763, 764, 765, 766, 767 and 768. Each portion connects the SGD transistors in a set of NAND strings. For example, SGD layer portion 763 or line connects the SGD transistors in the set of NAND strings NS0A to NS0A-14. Regions 751, 752, 753, 754, 755 and 756 represent the SGD transistors (as circles) of respective sets of NAND strings in the SGD layer portions 763, 764, 765, 766, 767 and 768, respectively. The portion 707 from FIG. 7A is also repeated. The select gate transistors are associated with NAND strings NS0A-NS5A.

FIG. 7C depicts an embodiment of a stack 776 showing a cross-sectional view of the portion 707 of FIG. 7A, along line 705. In this example, three SGD layers, three SGS layers and dummy word line layers DWLL1 and DWLL2 are provided. Columns of memory cells corresponding to NAND strings NS0A-NS3A are depicted in the multi-layer stack. The stack includes a substrate 101, an insulating film 250 on the substrate, and a portion of a source line SL0A. Additional straight NAND strings in a SGD line subset extend behind the NAND strings depicted in the cross-section, e.g., along the x-axis. NS0A has a source end SEa and a drain end DEa. The slits 746, 747 and 748 from FIG. 7A are also depicted. A portion of the bit line BL0A is also depicted. A conductive via 773 connects DEa to BL0A. The columns are formed in memory holes MH0-MH4. The memory holes are columnar and extend at least from a top 770 to a bottom 771 of the stack.

The source line SL0A is connected to the source ends of each NAND string. SL0A is also connected to other sets of memory strings which are behind these NAND strings in the x direction.

Word line layers, e.g., WLL0-WLL23, and dielectric layers, e.g., DL0-DL24, are arranged alternatingly in the stack. SGS transistors SGS1 *a*, SGS1 *b*, SGS1 *c* and SGS1 *d* are formed in the SGS1 layer. Regions SGD1 *a*, SGD1 *b*, SGD1 *c* and SGD1 *d* represent SGD transistors.

The use of one or more dummy memory cells between the select gate transistors and the data-storing memory cells is useful since program disturb can be greater for memory cells adjacent to, or close to, the select gate transistors. These edge cells have a lower amount of channel boosting due to constraints on the voltages of the select gate transistors of an inhibited NAND string.

FIG. 8A depicts a view of the region 774 of FIG. 7C, showing memory cells MC1 to MC5. A number of layers can be deposited along the sidewalls of the column and within each word line layer. These layers can include oxide-nitride-oxide (O—N—O) and polysilicon layers which are deposited, e.g., using atomic layer deposition.

For example, the column includes a charge-trapping layer or film (CTL) 803 such as SiN or other nitride, a tunnel oxide (TNL) 804, a polysilicon body or channel (CH) 805, and a dielectric core (DC) 806. A word line layer includes a block oxide (BOX) 802, a block high-k material 801, a barrier metal 800, and a conductive metal 899, such as tungsten, as a control gate. For example, control gates CG0, CG1, CG2, CG3 and CG4 are provided for the memory cells MC0, MC1, MC2, MC3 and MC4, respectively. In another approach, all of these layers except the metal are provided in the column. Additional memory cells are similarly formed throughout the columns. The layers in the memory hole form a columnar active area (AA) of the NAND string.

When a memory cell is programmed, electrons are stored in a portion of the CTL which is associated with the memory cell. These electrons are drawn into the CTL from the channel, and through the TNL. The Vth of a memory cell is increased in proportion to the amount of stored charge. During an erase operation, the electrons return to the channel.

Each of the memory holes can be filled with a plurality of annular layers comprising a block oxide layer, a charge-trapping layer, a tunneling layer and a channel layer. A core region of each of the memory holes is filled with a body material, and the plurality of annular layers are between the core region and the WLLs in each of the memory holes.

Figure 8B:
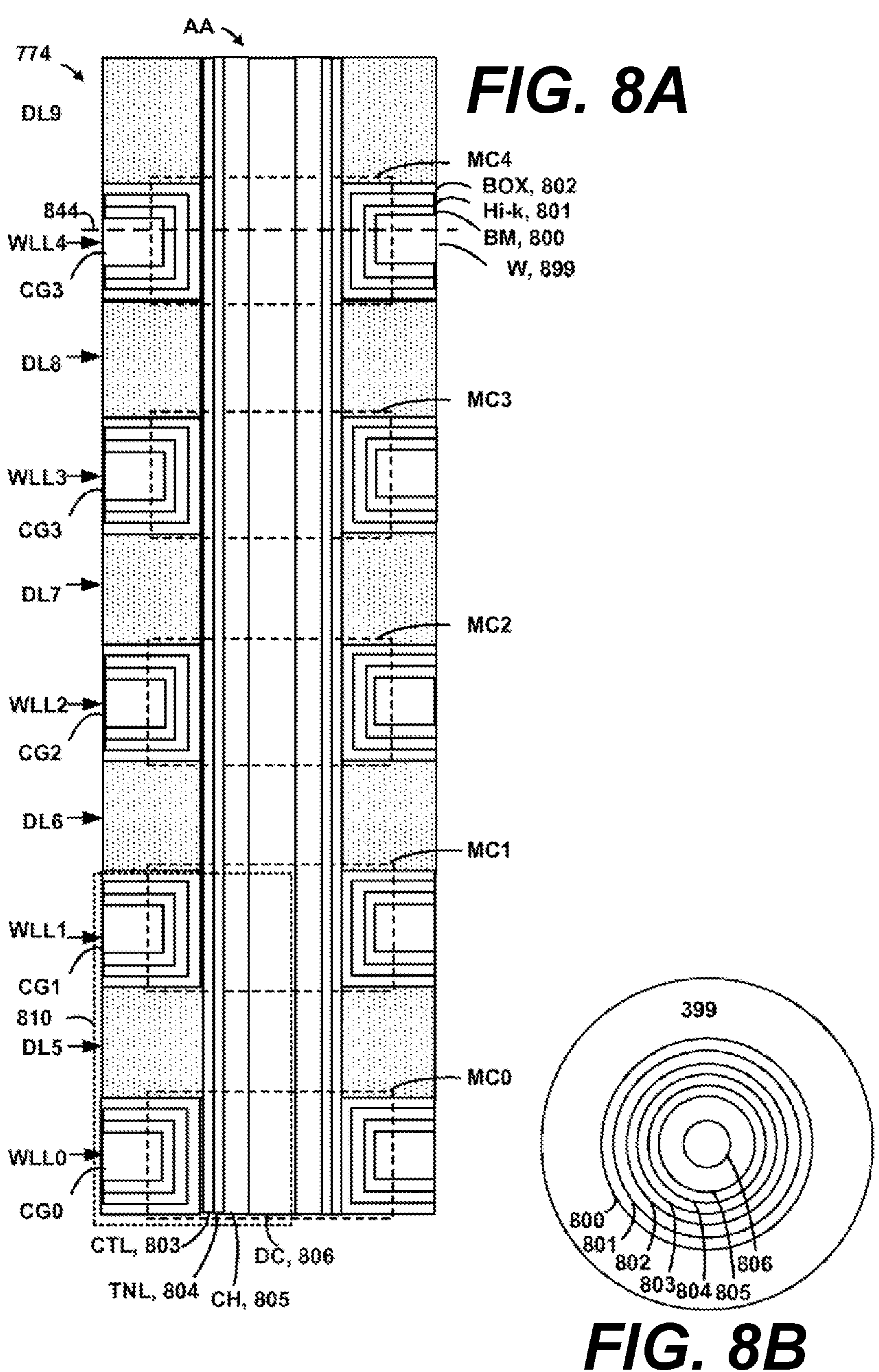
FIG. 8B depicts a cross-section view of the region 774 of FIG. 4A along line 444 according to aspects of the disclosure.

FIG. 8B depicts a cross-section view of the region 774 of FIG. 8A along line 844. Each layer is ring-shaped in one possible approach, except the core filler, which is a cylinder.

Figure 9:
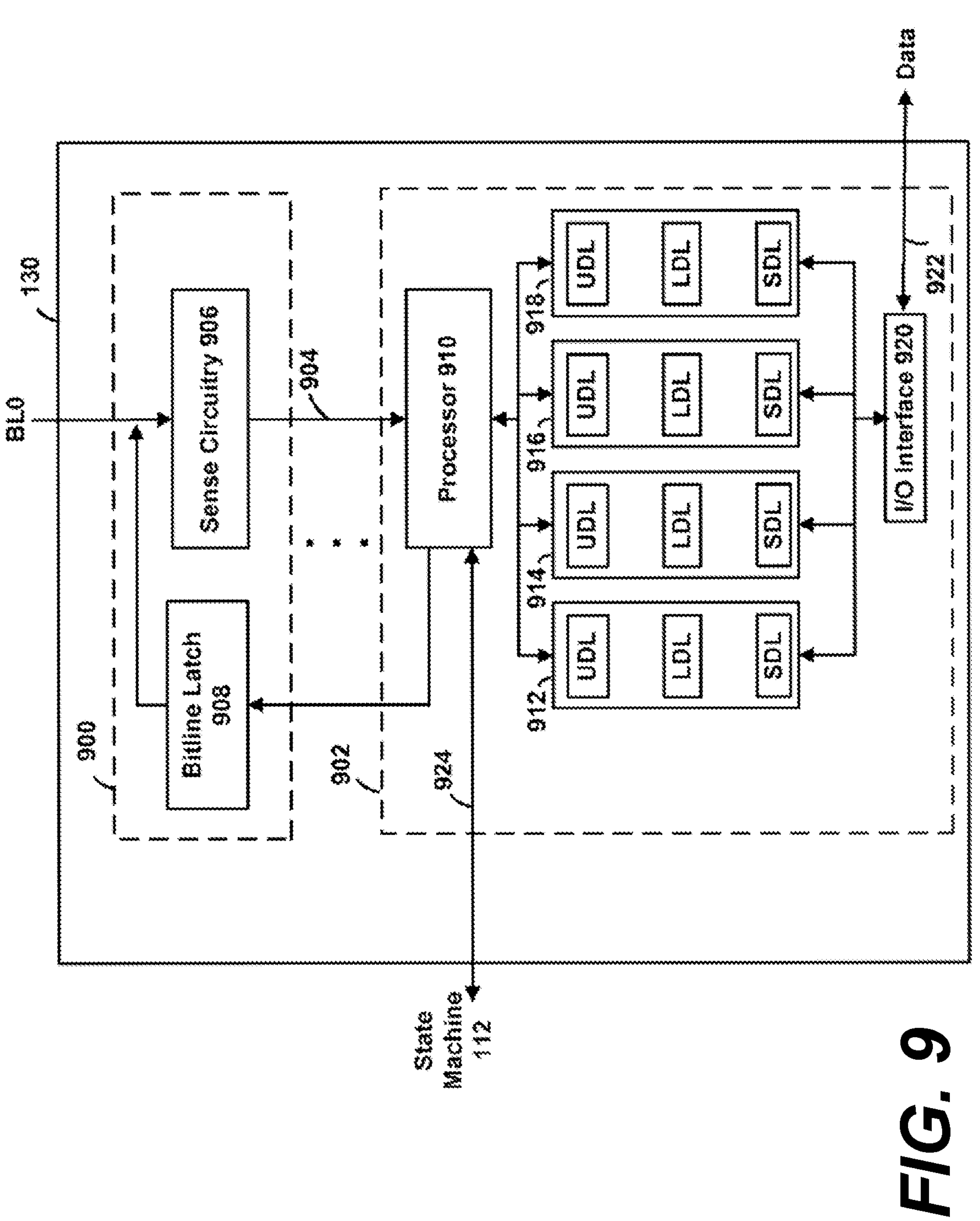
FIG. 9 is a block diagram depicting an embodiment of a sense block of FIG. 1B according to aspects of the disclosure.

FIG. 9 is a block diagram depicting an embodiment of sense block 130 of FIG. 5. Sense block 130 is partitioned into one or more core portions 900, referred to as sense modules or sense amplifiers, and a common portion 902, referred to as a managing circuit. In an embodiment, there is a separate sense module 900 for each bit line and one common managing circuit 902 for a set of multiple, e.g., four or eight, sense modules 900. Each of sense modules 900 in a group communicates with the associated managing circuit 902 via a data bus 904. Thus, there are one or more managing circuits 902 which communicate with sense modules 900 of a set of memory cells.

Sense module 900 includes sense circuitry 906 that performs sensing by determining whether a conduction current in a connected bit line is above or below a predetermined threshold level. Sense module 900 includes a bit line latch 908 that is used to set a voltage condition on the connected bit line. For example, a predetermined state latched in bit line latch 908 will result in the connected bit line being pulled to a state designating program inhibit (e.g., 1.5-3 V). As an example, flag=0 can inhibit programming, while flag=1 allows programming.

Managing circuit 902 includes a processor 910, four example sets of data latches 912-918, and an I/O Interface 920 coupled between the sets of data latches 912-918 and data bus 922. One set of data latches can be provided for each sense module 900, and data latches identified by SDL, LDL and UDL may be provided for each set. LDL stores a bit for a lower page (LP) of write data, and UDL stores a bit for an upper page (UP) of write data, in a memory which stores two bits of data in each memory cell. SDL stores a bit from a read of a memory cell. During a read operation, the SDL latch first receives the bit and optionally can transfer the bit to the other data latches. Moreover, in one approach, LDL is the only data latch the control circuitry can access so that the LP and UP data are toggled out from the LP latch during a read.

Additional data latches could be used as well. For example, in a three-bit per memory cell implementation, one extra data latch may be used to store a middle page (MP) of data. A four-bit per memory cell implementation can use lower-middle and upper-middle data latches.

Processor 910 performs computations, such as to determine the data stored in the sensed memory cell and store the determined data in the set of data latches 912-918. Each set of data latches 912-918 is used to store data bits determined by processor 910 during a read operation, and to store data bits imported from the data bus 922 during a programming operation which represent write data meant to be programmed into the memory. I/O interface 920 provides an interface between data latches 912-918 and data bus 922.

During reading, the operation of the system is under the control of state machine 112 that controls the supply of different control gate voltages to the addressed memory cell. As it steps through the various predefined control gate voltages corresponding to the various memory states supported by the memory, the sense module may trip at one of these voltages and a corresponding output will be provided from sense module to processor 910 via bus 904. At that point, processor 910 determines the resultant memory state by consideration of the tripping event(s) of the sense module and the information about the applied control gate voltage from the state machine via input lines 924. Processor 910 then computes a binary encoding for the memory state and stores the resultant data bits into data latches 912-918. In another embodiment of the managing circuit 902, bit line latch 908 serves both as a latch for latching the output of the sense module and also as a bit line latch as described above.

Some implementations can include multiple processors 910. In one embodiment, each processor 910 will include an output line (not depicted) such that each of the output lines is wired-OR'd together. In some embodiments, the output lines are inverted prior to being connected to the wired-OR line. This configuration enables a quick determination during the program verification process of when the programming process has completed because the state machine receiving the wired-OR can determine when all bits being programmed have reached the desired level.

For example, when each bit has reached its desired level, a logic zero for that bit will be sent to the wired-OR line (or a data one is inverted). When all bits output a data 0 (or a data one inverted), then the state machine knows to terminate the programming process. Because each processor communicates with eight sense modules, the state machine needs to read the wired-OR line eight times, or logic is added to processor 910 to accumulate the results of the associated bit lines such that the state machine need only read the wired-OR line one time. Similarly, by choosing the logic levels correctly, the global state machine can detect when the first bit changes its state and change the algorithms accordingly.

During program or verify operations, the data to be programmed (write data) is stored in the set of data latches 912-918 from the data bus 922, in the LP and UP data latches. The programming operation, under the control of state machine 112, comprises a series of program voltage pulses applied to the control gates of the addressed memory cells. Each program pulse is followed by a read back (verify) to determine if the memory cell has been programmed to the desired memory state. In some cases, processor 910 monitors the read back memory state relative to the desired memory state. When the two states agree, processor 910 sets bit line latch 908 to cause the bit line to be pulled to a state designating program inhibit. This inhibits the memory cell coupled to the bit line from further programming even if program pulses appear on its control gate. In other embodiments, processor 910 initially loads bit line latch 908 and sense circuitry 906 sets it to an inhibit value during the verify process.

Each set of data latches 912-918 may be implemented as a stack of data latches for each sense module 900. In an embodiment, there are three data latches 912-918 per sense module 900. In some implementations, data latches 912-918 are implemented as a shift register so that the parallel data stored therein is converted to serial data for data bus 922, and vice versa. All the data latches corresponding to the read/write block of memory cells can be linked together to form a block shift register so that a block of data can be input or output by serial transfer. In particular, the bank of read/write modules is adapted so that each of its set of data latches will shift data in to or out of the data bus in sequence as if they are part of a shift register for the entire read/write block.

Data latches 912-918 identify when an associated memory cell has reached certain mileposts in a programming operation. For example, data latches 912-918 may identify that the Vth of a memory cell is below a particular verify level. Data latches 912-918 indicate whether a memory cell currently stores one or more bits from a page of data. For example, an LP data latch is flipped (e.g., from 0 to 1) when a lower page bit is stored in an associated memory cell. An UP data latch is flipped when an upper page bit is stored in an associated memory cell. The flipping of a bit occurs when an associated memory cell completes programming, e.g., when its Vth exceeds a target verify level. When lower, middle and upper page bits are used (e.g., in case of three-bit per memory cell memory), the MP data latch is also flipped when a middle page bit is stored in an associated memory cell.

Figure 10A:
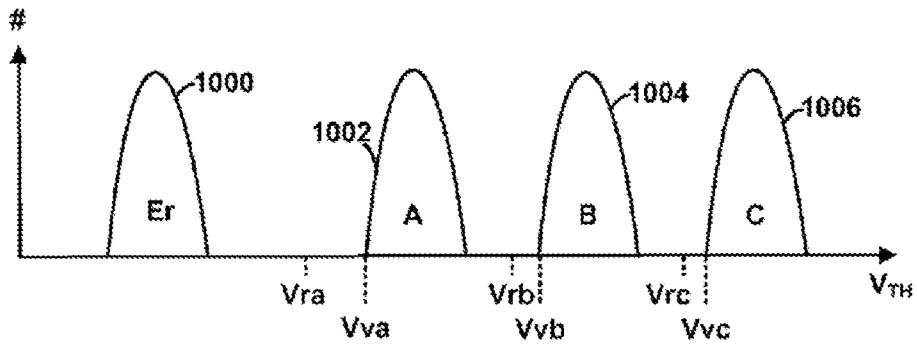
FIG. 10A depicts an embodiment of a set of threshold voltage distributions for a four-state memory device in which each memory cell stores two bits of data according to aspects of the disclosure.

FIG. 10A depicts an embodiment of a set of Vth distributions for a four-state memory device in which each memory cell stores two bits of data. A first Vth distribution 1000 is provided for erased (Er-state) memory cells. Three Vth distributions 1002, 1004 and 1006 represent programmed states A, B and C, respectively. In an embodiment, the threshold voltages in the Er-state and the threshold voltages in the A, B and C distributions are positive. In another embodiment, the threshold voltage distribution for the Er-state is negative, whereas the threshold voltage distributions for the A-state, B-state and C-state distributions are positive.

Three read reference voltages, Vra, Vrb and Vrc, also are provided for reading data from memory cells. By testing whether the threshold voltage of a given memory cell is above or below Vra, Vrb and Vrc, the system can determine a memory cell's state, e.g., programming condition.

Further, three verify reference voltages, Vva, Vvb and Vvc, are provided. When programming memory cells to the A-state, B-state or C-state, the system will test whether those memory cells have a threshold voltage greater than or equal to Vva, Vvb or Vvc, respectively.

In an embodiment known as full sequence programming, memory cells can be programmed from the Er-state directly to any of the programmed states A, B or C. For example, a population of memory cells to be programmed may first be erased so that all memory cells in the population are in the Er-state. A series of program pulses, such as depicted in FIG. 10F, may then be used to program memory cells directly into states A, B or C. Although some memory cells are being programmed from the Er-state to the A-state, other memory cells are being programmed from the Er-state to the B-state and/or from the Er-state to the C-state.

During programming, when the Vth of a memory cell which is being programmed to the A-state as a target state reaches or exceeds Vva, the memory cell is locked out from further programming, such as by raising the associated bit line voltage to a full inhibit level, e.g., 4-6 V. Similarly, when the Vth of a memory cell which is being programmed to the B-state as a target state reaches or exceeds Vvb, the memory cell is locked out from further programming. Likewise, when the Vth of a memory cell which is being programmed to the C-state as a target state reaches or exceeds Vvc, the memory cell is locked out from further programming.

Figure 10B:
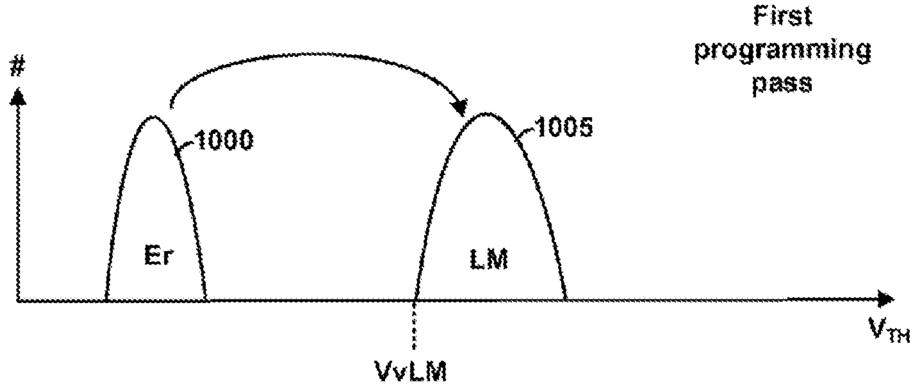
FIG. 10B depicts an embodiment of a first pass of a two-pass programming technique according to aspects of the disclosure.

As an alternative to full sequence programming, each memory cell may be programmed in two or more programming passes. FIG. 10B depicts an embodiment of a first pass of a two-pass programming technique. In this example, referred to as LM-fine programming, a multi-bit memory cell stores data for two different pages: a lower page and an upper page. Four states are depicted by repeating the threshold voltage distributions 1000, 1002, 1004 and 1006 from FIG. 10A. These states, and the bits they represent, are: Er-state (11), A-state (01), B-state (00) and C-state (10).

For Er-state, the lower page and upper page both store a "1." For A-state, the lower page stores a "1" and the upper page stores a "0." For B-state, the lower page and the upper page both store "0." For C-state, the lower page stores "0" and the upper page stores "1." Note that although specific bit patterns have been assigned to each of the states in this illustrated example, different bit patterns also may be assigned.

In the first programming pass, the lower page is programmed for a selected word line WLn. If the lower page is to remain data 1, then the memory cell state remains at state Er (distribution 1000). If the lower page is to be programmed to 0, then the threshold voltage of the memory cells on WLn are raised such that the memory cell is programmed to an intermediate (LM or lower-middle) state (distribution 1005).

For example, a series of program pulses, such as depicted in FIG. 10F, may be used to program memory cells from the Er-state to the LM-state. In an embodiment, after a memory cell is programmed from the Er-state to the LM-state, its neighbor memory cell on an adjacent word line WLn+1 in the NAND string will then be programmed with respect to its lower page in a respective first programming pass of the adjacent word line.

Figure 10C:
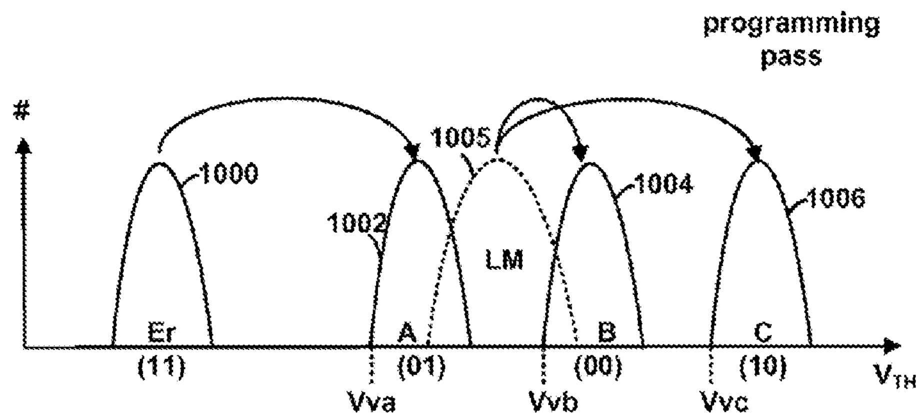
FIG. 10C depicts an embodiment of a second pass of the two-pass programming technique of FIG. 10A according to aspects of the disclosure.
Figure 10D:
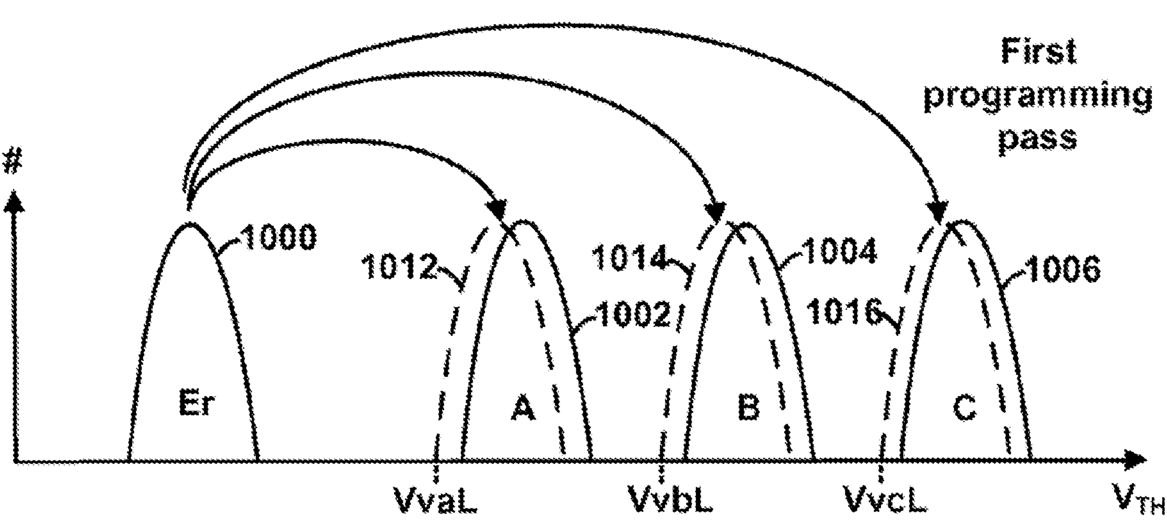
FIG. 10D depicts an embodiment of a first pass of another two-pass programming technique according to aspects of the disclosure.

FIG. 10C depicts an embodiment of a second pass of the two-pass programming technique referred to in FIG. 10B. The A-state memory cells are programmed from the Er-state distribution 1000 to the A-state distribution 1002. For example, a series of program pulses, such as depicted in FIG. 10F, may be used to program memory cells from the Er-state to the A-state. Likewise, the B-state memory cells are programmed from the LM-state distribution 1005 to the B-state distribution 1004, and the C-state memory cells are programmed from the LM-state distribution 1005 to the C-state distribution 1006. For example, a series of program pulses, such as depicted in FIG. 10F, may be used to program memory cells from the LM-state to the A-state, and from the LM-state to the C-state. This is the fine programming pass.

Persons of ordinary skill in the art will understand that other multi-pass programming techniques may be used. For example, FIG. 10D depicts an embodiment of a first pass of another two-pass programming technique. In this example, referred to as foggy-fine (or course-fine) programming, the A-state, B-state and C-state memory cells are programmed from the Er-state to lower A-state distribution 1012, lower B-state distribution 1014, and lower C-state distribution 1016, using lower verify levels VvaL, VvbL and VvcL, respectively. For example, a series of program pulses, such as depicted in FIG. 10F, may be used to program memory cells from the Er-state to the lower A-state, the lower B-state and the lower C-state. This is the foggy (or course) programming pass. A relatively large program voltage step size may be used, for instance, to quickly program the memory cells to the respective lower verify levels.

Figure 10E:
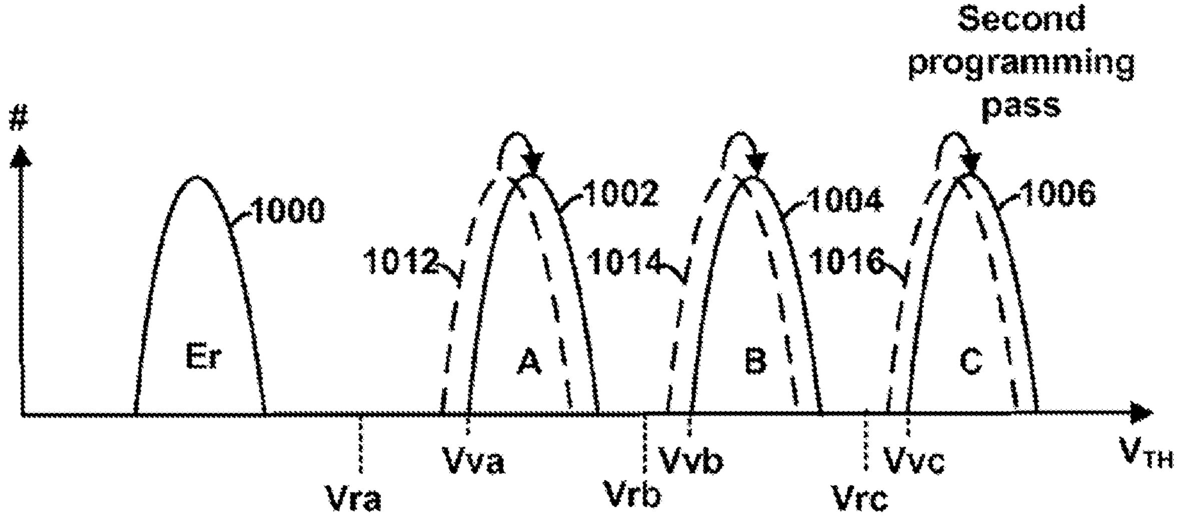
FIG. 10E depicts an embodiment of a second pass of the two-pass programming technique of FIG. 10D according to aspects of the disclosure.
Figure 10F:
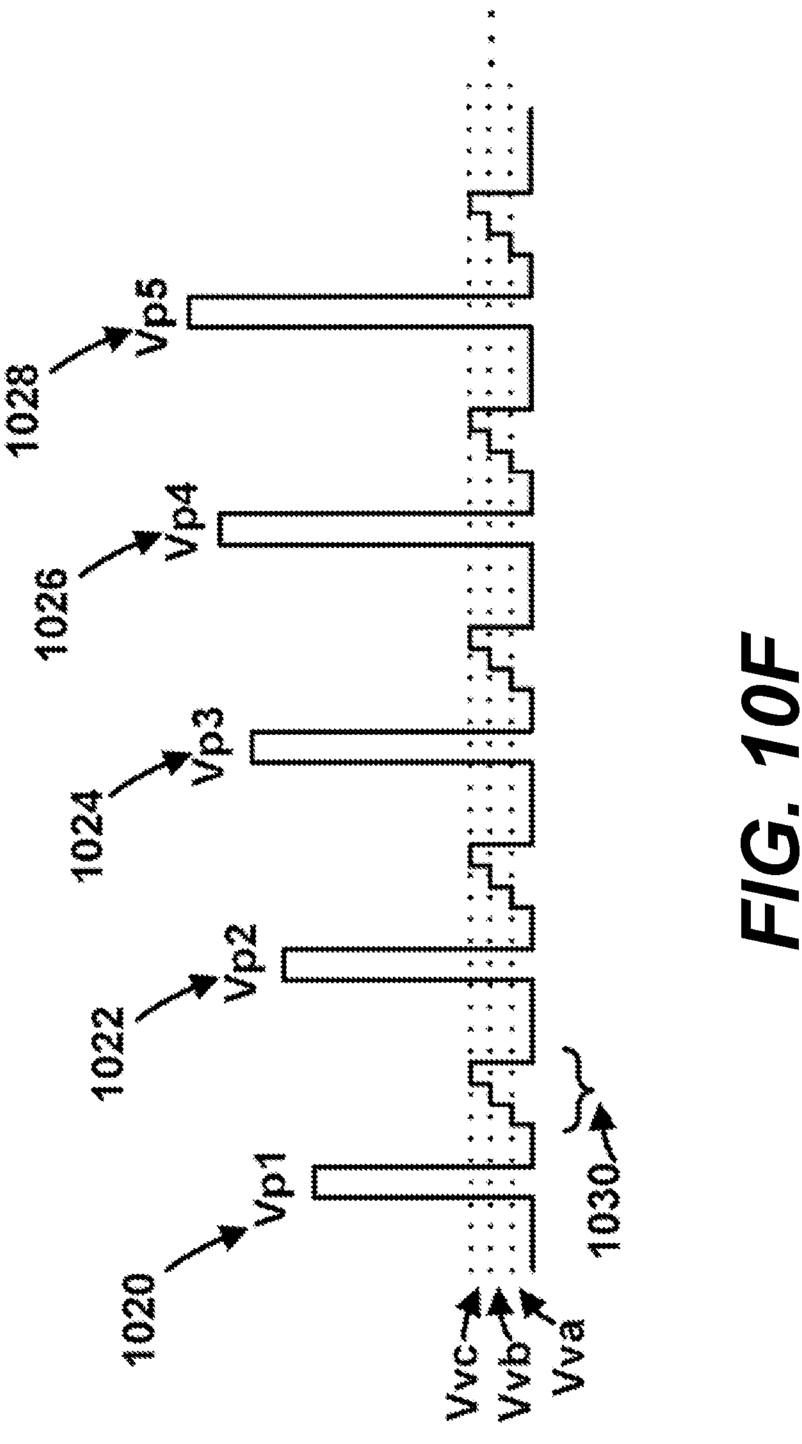
FIG. 10F depicts an embodiment of a series of program and verify pulses which are applied to a selected word line during a programming operation according to aspects of the disclosure.

FIG. 10E depicts an embodiment of a second pass of the two-pass programming technique referred to in FIG. 10D. The A-state, B-state and C-state memory cells are programmed from the lower A-state distribution 1012, lower B-state distribution 1014 and lower C-state distribution 1016 to the A-state distribution 1002, B-state distribution 1004 and C-state distribution 1006, respectively, using the nominal, higher verify levels Vva, Vvb and Vvc, respectively. For example, a series of program pulses, such as depicted in FIG. 10F, may be used to program memory cells from the lower A-state to the A-state, from the lower B-state to the B-state, and from the lower C-state to the C-state. This is the fine programming pass. A relatively small program voltage step size may be used, for instance, to slowly program the memory cells to the respective final verify levels while avoiding a large overshoot.

Persons of ordinary skill in the art will understand that multi-pass programming technique may use more than two programming passes.

Although the programming examples depict four data states, two pages of data, and two or three programming passes, the concepts described herein may be applied to other implementations with more than four states, more than two pages, and/or more than three programming passes. For example, memory devices may utilize eight or sixteen states per memory cell. Moreover, in the example programming techniques discussed herein, the Vth of a memory cell may be raised gradually in multiple programming passes as it is programmed to a target data state.

FIG. 10F depicts an embodiment of a series of program and verify pulses which are applied to a selected word line during a programming operation. A programming operation may include multiple program-verify iterations, where each iteration applies one or more programming pulses followed by one or more verify pulses (e.g., to verify or determine the programming state or the programming level of a memory cell) to a selected word line.

In an embodiment, the programming pulses are stepped up in successive iterations. Moreover, each programming pulse may have a programming voltage (Vp1, Vp2, . . . ) level, e.g., 12-25 V. For example, as depicted in FIG. 10F, first, second, third, fourth and fifth programming pulses 1020, 1022, 1024, 1026 and 1028 have programming voltage levels of Vp1, Vp2, Vp3, Vp4 and Vp5, respectively. One or more verify voltages 1030, such as verify voltages Vva, Vvb and Vvc, may be provided after each programming pulse.

Figure 11:
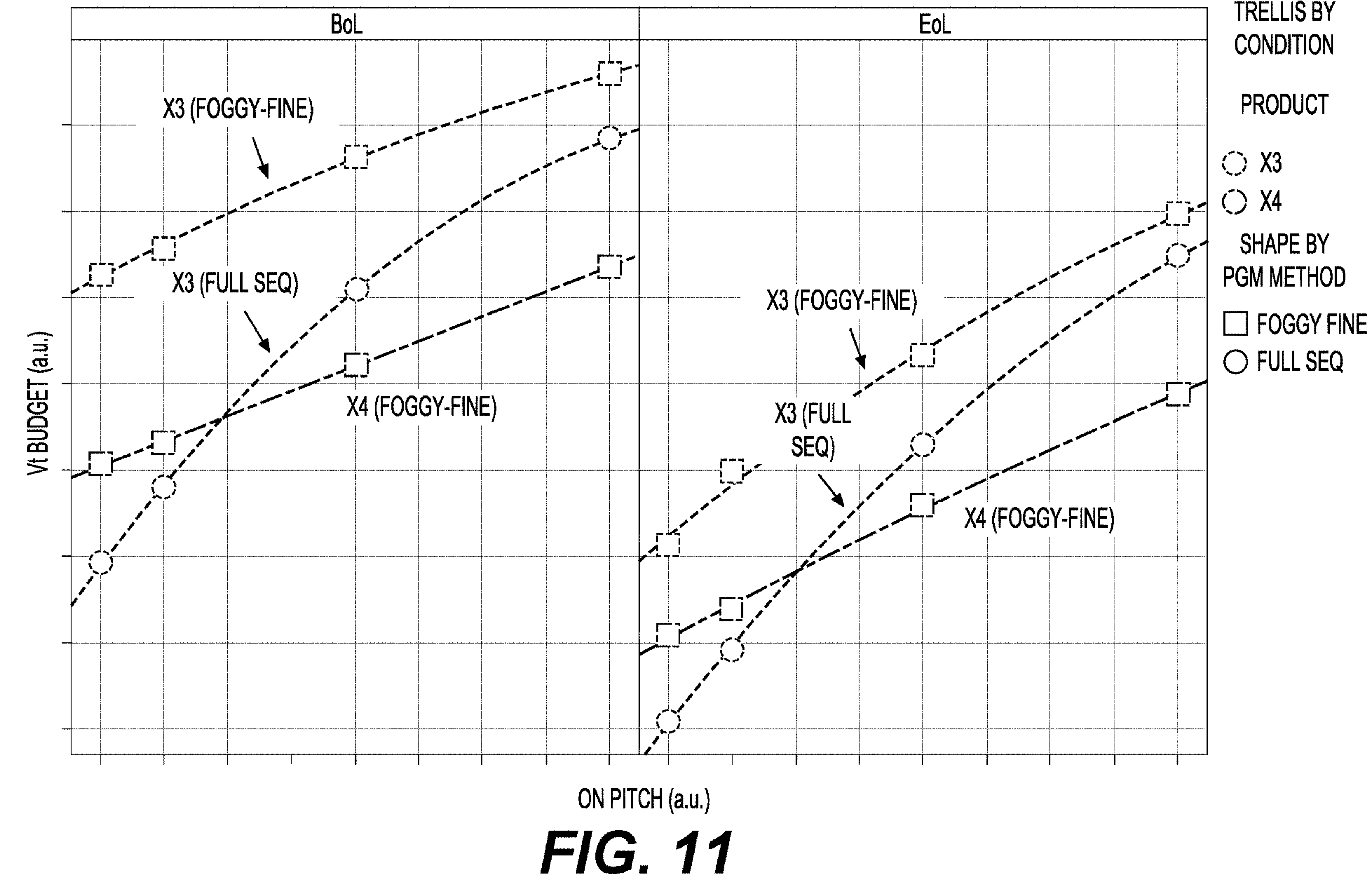
FIG. 11 is a plot of threshold voltage budget versus ON pitch for memory apparatuses including triple-level memory cells (TLC) and quad-level memory cells (QLC) when programmed with a full-sequence programming operation and when programmed with a foggy-fine programming operation according to aspects of the disclosure.

As discussed, reducing the spacing between adjacent word lines can cause decreases in threshold voltage Vt budget. FIG. 11 is a plot of threshold voltage Vt budget versus ON pitch (i.e., spacing of the word lines) for memory apparatuses including triple-level memory cells (TLC)(i.e., X3) and quad-level memory cells (QLC)(i.e., X4) when programmed with a full-sequence programming operation (see e.g., FIG. 10F) and when programmed with a foggy-fine programming operation (see e.g., FIGS. 10D and 10E). As shown X3 has been found to be much more sensitive (>40%) to ON pitch reduction compared to X4, thus will be the limiting case for the ON pitch scaling in future memory apparatuses. Moreover, growing word line variation is expected in future memory apparatuses, because of the memory holes being longer or greater in height in the stack and hence more complex processes are required, leading to the presence of bad word lines that constrain the ON pitch scaling. It has been found that the large ON pitch sensitivity of X3 stems from the large neighbor word line interference (NWI) at small ON pitch. Continuing to refer to FIG. 11, multi-pass programming operations (e.g., foggy-fine) can significantly reduce the ON pitch sensitivity of X3. So, full sequence programming operations can provide fast programming times, however, there can be strong ON pitch sensitivity and severe NWI and hence threshold voltage Vt budget loss with small ON pitch word lines. Multi-pass programming operations (e.g., foggy-fine in FIGS. 10D and 10E or LM-fine in FIGS. 10B and 10C), in contrast, result in weaker ON pitch sensitivity. This helps small ON pitch or worse NWI word lines to gain threshold voltage Vt budget, extending Z-scaling (i.e., vertically in the stack). Nevertheless, multi-pass programming operations typically result in slower program times.

Figure 12:
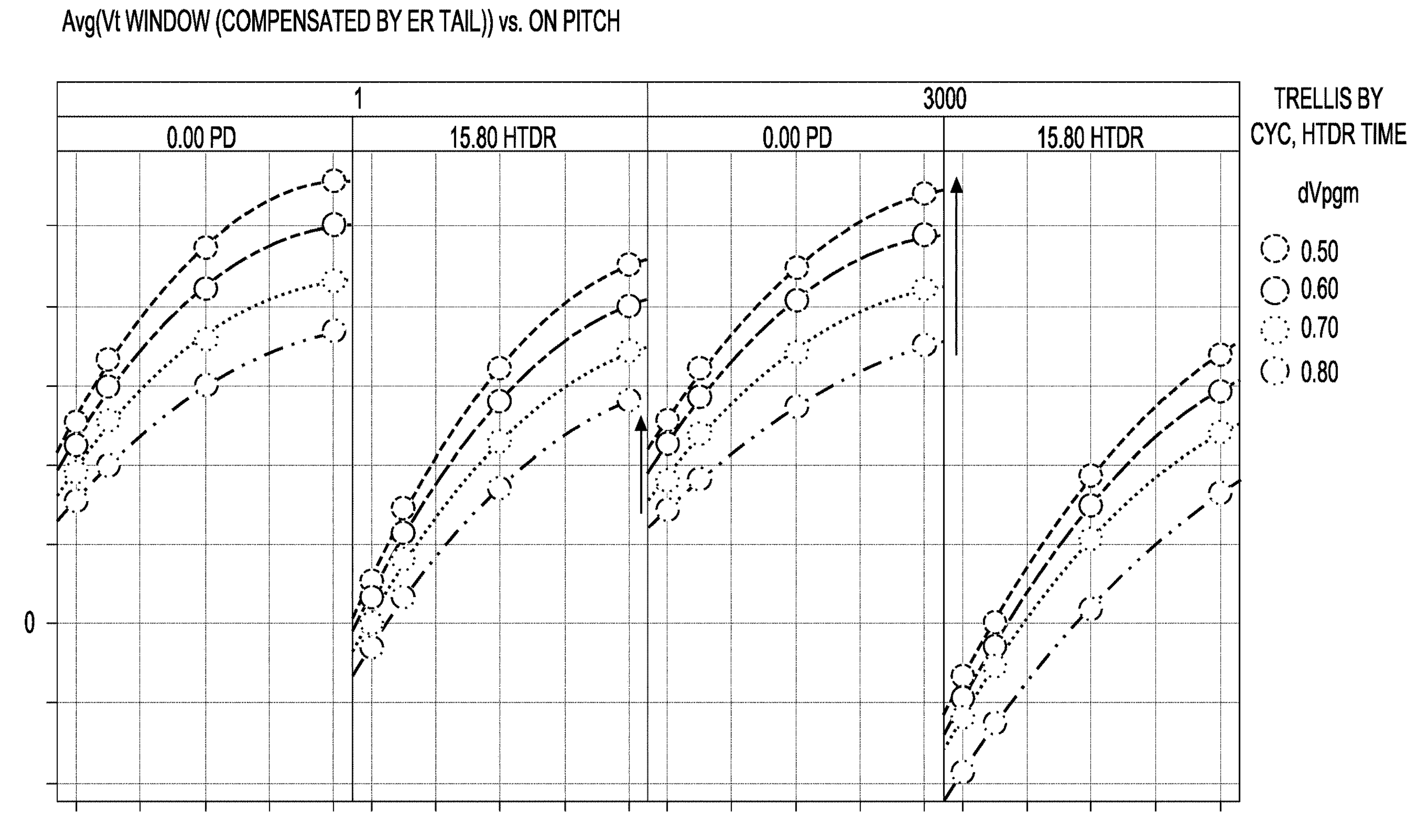
FIG. 12 is a plot of an average threshold voltage window versus ON pitch for memory cells that have not been cycled and memory cells that have been cycled for power on and high temperature data retention/HTDR for a plurality of program voltage step sizes for the programming pulses of each programming loop level increases each loop according to aspects of the disclosure.

FIG. 12 is a plot of an average threshold voltage Vt window (compensated by the "Er" state tail) versus ON pitch for memory cells that have not been cycled (indicated as 1) and memory cells that have been cycled for power on (PD) and high temperature data retention/HTDR for a plurality of program voltage step sizes dVpgm for the programming pulses of each programming loop (i.e., the amount that the programming voltage (Vp1, Vp2, . . . ) level increases each loop, e.g., from programming pulse 1020 to programming pulse 1022). FIG. 13 is a plot of threshold voltage Vt distributions for triple-level cells programmed using the plurality of program voltage step sizes dVpgm for memory cells that have been cycled for power on (PD) and high temperature data retention/HTDR. As shown, smaller program voltage step size dVpgm is not effective to improve the threshold voltage Vt budget for small ON pitch, since NWI is dominant. Referring back to FIG. 11 for example, foggy-fine program operations or other multi-pass programming algorithms are much more effective to improve the threshold voltage Vt budget for small ON pitch Consequently, described herein is a memory apparatus (e.g., non-volatile memory system 100 in FIG. 1) including memory cells (e.g., memory cells 423-426 in FIG. 4) each connected to one of a plurality of word lines (e.g., WLL0-WLL22 in FIG. 7C). The memory cells are disposed in memory holes (e.g., memory holes MH0-MH4 of FIG. 7C) and are configured to retain a threshold voltage Vth corresponding to one of a plurality of data states (e.g., "Er", "A", "B", "C" in FIG. 10A). The apparatus also includes a control means (e.g., control circuitry 110, controller 122, row decoder 124, source control circuits 127, read/write circuits 128, sense blocks 130, and column decoder 132 in FIG. 1) coupled to the plurality of word lines and the memory holes and configured to identify at least one grouping of the memory cells to be programmed with a multi-pass programming operation. In addition, the control means is configured to program the at least one grouping of the memory cells using the multi-pass programming operation. The control means is also configured to program the memory cells other than the at least one grouping of the memory cells in a full sequence programming operation.

Figure 14:
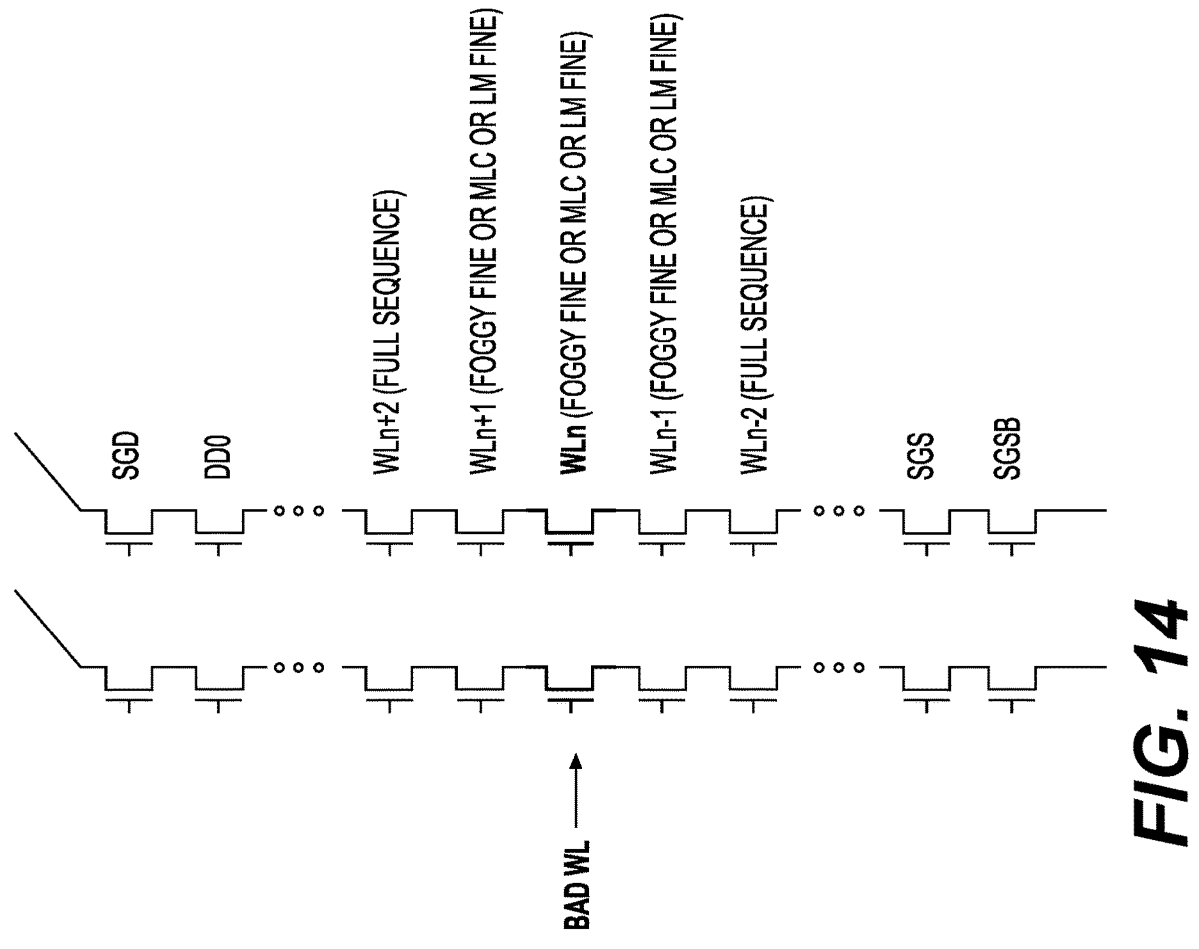
FIG. 14 shows two strings of memory cells along with corresponding word lines including at least one neighboring word line according to aspects of the disclosure.

FIG. 14 shows two strings of memory cells along with corresponding word lines including at least one neighboring word line. As shown, the at least one neighboring word line (indicated as WLn+1 and WLn−1 in FIG. 14) is immediately adjacent to each of the plurality of word lines identified as bad word lines (indicated as WLn). Thus, according to an aspect, the at least one grouping of the memory cells to be programmed with a multi-pass programming operation is the memory cells connected to ones of the plurality of word lines identified as the bad word lines and the at least one neighboring word line. So, the control means is further configured to program and read the memory cells of each of the plurality of word lines to determine whether a threshold voltage budget for the one of the plurality of word lines is below a predetermined threshold voltage budget, the threshold voltage budget being a summation of a plurality of margins each disposed between ones of the plurality of data states. The control means is also configured to identify the plurality of word lines with the threshold voltage budget below the predetermined threshold voltage budget as the bad word lines to be programmed with the multi-pass programming operation. The control means additionally programs the memory cells connected to ones of the plurality of word lines before (i.e., above or below in the stack depending on the programming sequence) the ones of the plurality of word lines identified as the bad word lines and the at least one neighboring word line in the full sequence programming operation. In addition, the control means is configured to program the ones of the plurality of word lines identified as the bad word lines and the at least one neighboring word line using the multi-pass programming operation. The control means is additionally configured to program the memory cells connected to ones of the plurality of word lines after (above or below in the stack depending on the programming sequence) the ones of the plurality of word lines identified as the bad word lines and the at least one neighboring word line in the full sequence programming operation.

Instead of identifying ones of the plurality of word lines as the bad word lines using the threshold voltage budget, threshold voltage margins disposed between ones of the plurality of data states can be used instead. So, according to another aspect, the control means is further configured to program and read the memory cells of each of the plurality of word lines to determine whether threshold voltage margins disposed between ones of the plurality of data states for the one of the plurality of word lines are below a predetermined threshold voltage margin limit. The control means is also configured to identify the plurality of word lines with the threshold voltage margins below the predetermined threshold voltage margin limit as the bad word lines to be programmed with the multi-pass programming operation. The control means programs the memory cells connected to ones of the plurality of word lines before (above or below in the stack depending on the programming sequence) the one of the plurality of word lines identified as the bad word lines and the at least one neighboring word line in the full sequence programming operation. In addition, the control means is configured to program the one of the plurality of word lines identified as the bad word lines and the at least one neighboring word line using the multi-pass programming operation. The control means is additionally configured to program the memory cells connected to ones of the plurality of word lines after (above or below in the stack depending on the programming sequence) the one of the plurality of word lines identified as the bad word lines and the at least one neighboring word line in the full sequence programming operation. Thus, the control means of the memory apparatus applies the multi-pass programming operation or algorithm on the bad word lines, which helps to mitigate ON pitch scaling challenge.

As discussed above, the memory cells other than the at least one grouping of the memory cells can be programmed in the full sequence programming operation. Thus, according to an aspect and with reference back to FIG. 10F, the control means is configured to program the memory cells other than the at least one grouping of the memory cells to the plurality of data states targeted for each of the memory cells by applying a plurality of pulses increasing in magnitude by a step amount to the ones of the plurality of word lines connected to the memory cells other than the at least one grouping of the memory cells during each of a plurality of programming loops of the full sequence programming operation.

Referring back to FIG. 10A, for example, the plurality of data states include, in order of increasing threshold voltage, an erased state (e.g., "Er" state) and a plurality of programmed data states (e.g., "A", "B", "C"). As discussed above and with reference back to FIGS. 10D and 10E, the control means is further configured to program each of the memory cells targeted for one of the plurality of programmed data states to one of a plurality of lower programmed data states corresponding with the one of the plurality of programmed data states targeted (e.g., lower A-state distribution 1012 corresponding to the "A" state) while each of the memory cells targeted for the erased state remains in the erased state in a first programming pass. Each of the plurality of lower programmed data states is associated with the threshold voltage being lower than the corresponding one of the plurality of programmed data states. The control means is also configured to program each of the memory cells programmed to the plurality of lower programmed data states to corresponding ones of the plurality of programmed data states targeted (e.g., from lower A-state distribution 1012 to distribution 1002 for the "A" state) while each of the memory cells targeted for the erased state remains in the erased state in a second programming pass.

Referring back to FIG. 10A, for example, the plurality of data states include, in order of increasing threshold voltage, the erased state (e.g., "Er" state) and a plurality of lower data states (e.g., "A" state) and a plurality of upper data states (e.g., "B" and "C" states). As discussed above and with reference back to FIGS. 10B and 10C, the control means is configured to program each of the memory cells targeted for one of the plurality of upper data states to an intermediate state (e.g., "LM" state) while each of the memory cells targeted for one of the plurality of lower data states remains in the erased state in a first programming pass. The control means is also configured to program each of the memory cells programmed to the intermediate state to the one of the plurality of upper data states targeted and each of the memory cells in the erased state to the one of the plurality of lower data states targeted while each of the memory cells targeted for the erased state remains in the erased state in a second programming pass.

Figure 15:
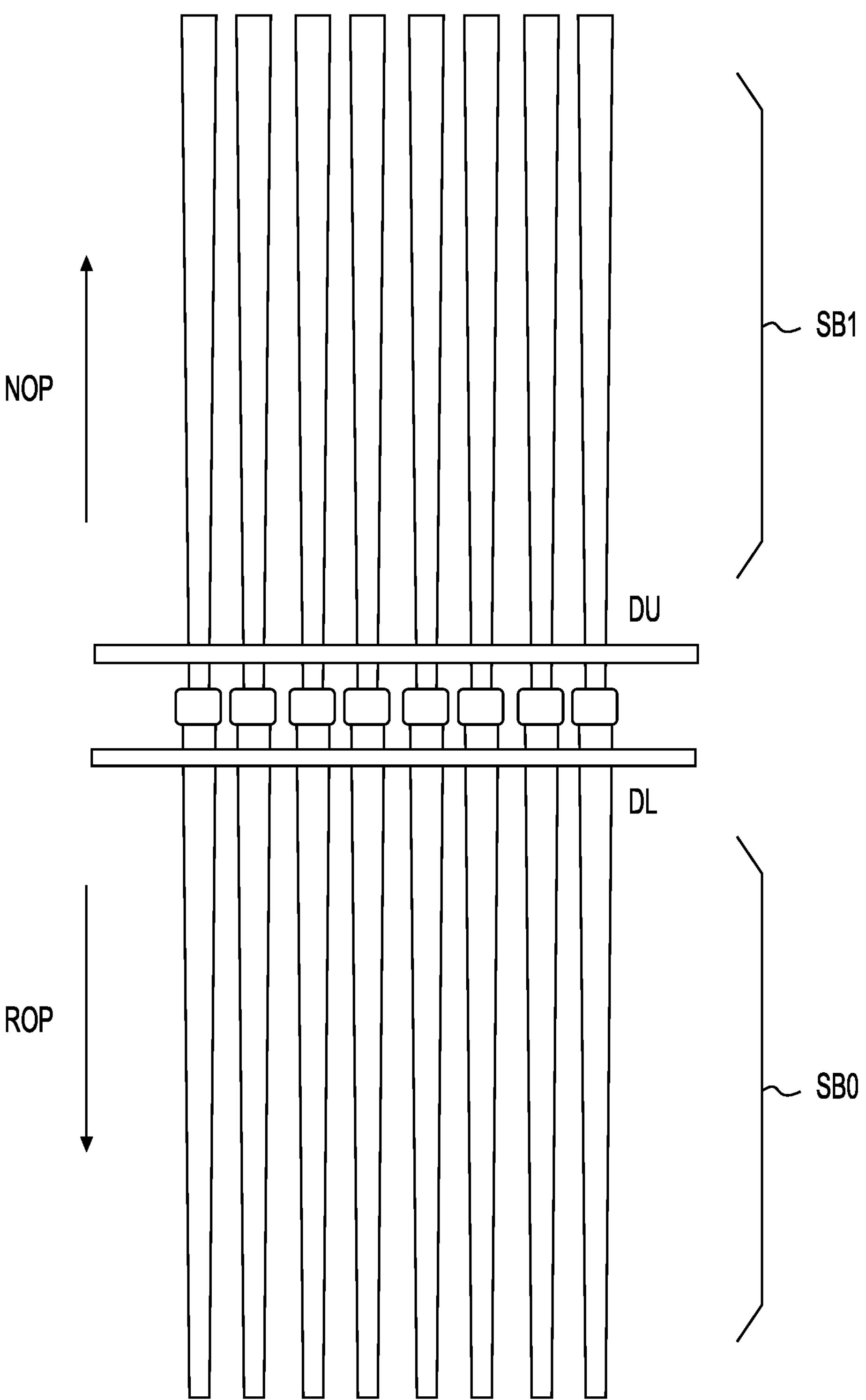
FIG. 15 shows an example block of memory cells according to aspects of the disclosure.
Figure 16:
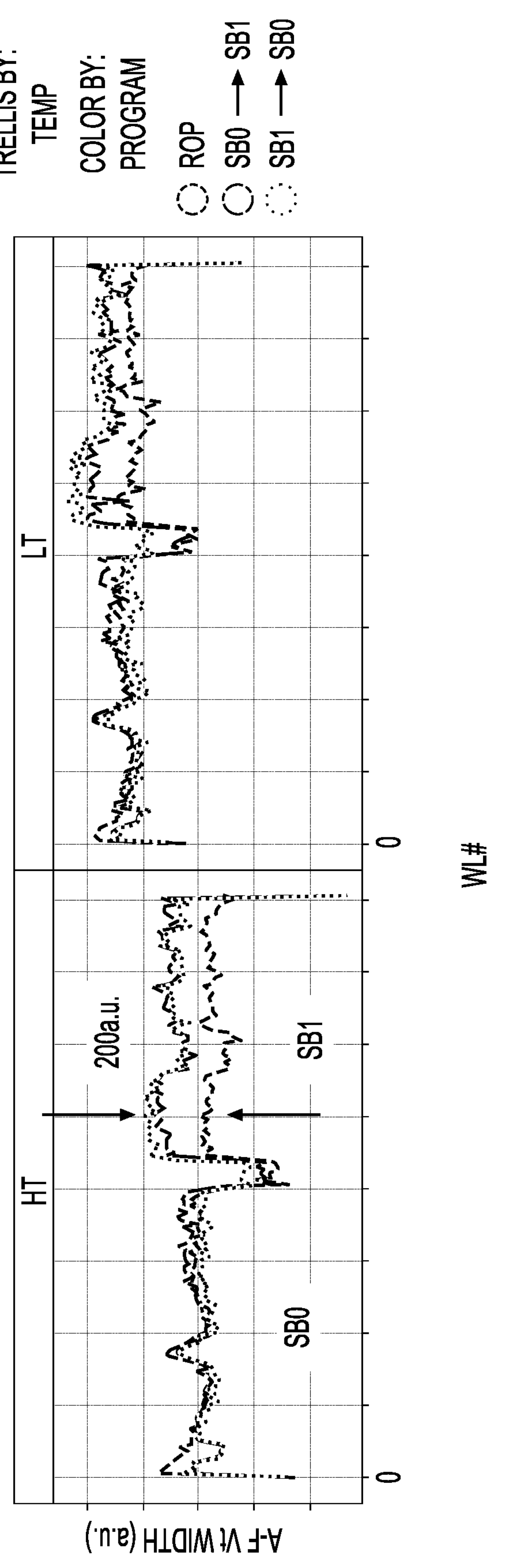
FIG. 16 shows a plot of the width of threshold voltage distributions of a plurality of data states A-F versus word line number for both high and low temperature according to aspects of the disclosure.

As previously discussed and with reference back to FIG. 7C, for example, the memory cells can be connected in series between a drain-side select gate transistor (e.g., SGD1, SGD2, SGD3 layers) on a drain-side of each of the memory holes and a source-side select gate transistor (e.g., SGS1, SGS2, SGS3 layers) on a source-side of each of the memory holes. The plurality of word lines (e.g., WLL0-WLL22) and a plurality of dielectric layers (e.g., DL0 to DL25) extend horizontally and overlay one another in an alternating fashion in a stack (e.g., stack 776). The memory holes or strings (e.g., NAND strings (e.g., NS0A, NS1A, NS2A, NS3A) extend vertically through the stack and the drain-side select gate transistor of each of the memory holes is connected to one of a plurality of bit lines (e.g., bit line BL0A) and the source-side select gate transistor of each of the memory holes is connected to a source line (source line SL0A). The memory holes are in rows comprising a plurality of strings. The plurality of strings are grouped in a plurality of blocks. FIG. 15 shows an example block of memory cells (the memory holes are shown extending from the top to the bottom of the figure). As shown, each of the plurality of blocks comprise a plurality of sub-blocks (e.g., SB1 and SB0) arranged vertically in the stack including a lower sub-block (e.g., SB0) adjacent to the source line and an upper sub-block (e.g., SB1) arranged vertically above the lower sub-block. FIG. 16 shows a plot of the width of threshold voltage distributions of a plurality of data states A-F versus word line number (indicative of height in the stack or block) for both high and low temperature. As shown, especially at high temperature, there is a 200 a.u. increase in the threshold voltage distribution width for SB1 with the default normal order program (NOP) compared to reverse order program (ROP). Note that ROP is cannot applied on SB1 due to large program disturb. So, according to an aspect, the at least one grouping of the memory cells to be programmed with the multi-pass programming operation is the memory cells of the upper sub-block, in order to compensate the threshold voltage Vt budget gap with respect to SB0. Thus, the control means is further configured to program the memory cells connected to each of the plurality of word lines associated with the lower sub-block with the full sequence programming operation in a reverse programming order in which the plurality of word lines are programmed beginning with word lines on the drain-side of each of the strings and progressing toward the source-side of each of the strings. The control means is also configured to program the memory cells connected to each of the plurality of word lines associated with the upper sub-block with the multi-pass programming operation in a normal programming order in which the plurality of word lines are programmed beginning with word lines on the source-side of each of the strings and progressing toward the drain-side of each of the strings. While FIGS. 10A-10E and examples discussed above relate primarily to multi-level memory cells (MLC) capable of each storing 2 bits, it should be appreciated that the disclosure herein also applies to triple-level memory cells (TLC). Indeed, as mentioned above with reference to FIG. 11, the hybrid programming algorithm described herein (i.e., programming bad word lines and neighbors or SB1 using the multi-pass programming operation and other word lines using the full sequence programming operation) is expected to enable reductions in ON pitch scaling especially for TLC. In addition, while foggy-fine and LM-fine as discussed herein as examples of the multi-pass programming operation, it should be understood that other multi-pass programming operations may also be used, such as MLC fine.

Figure 17:
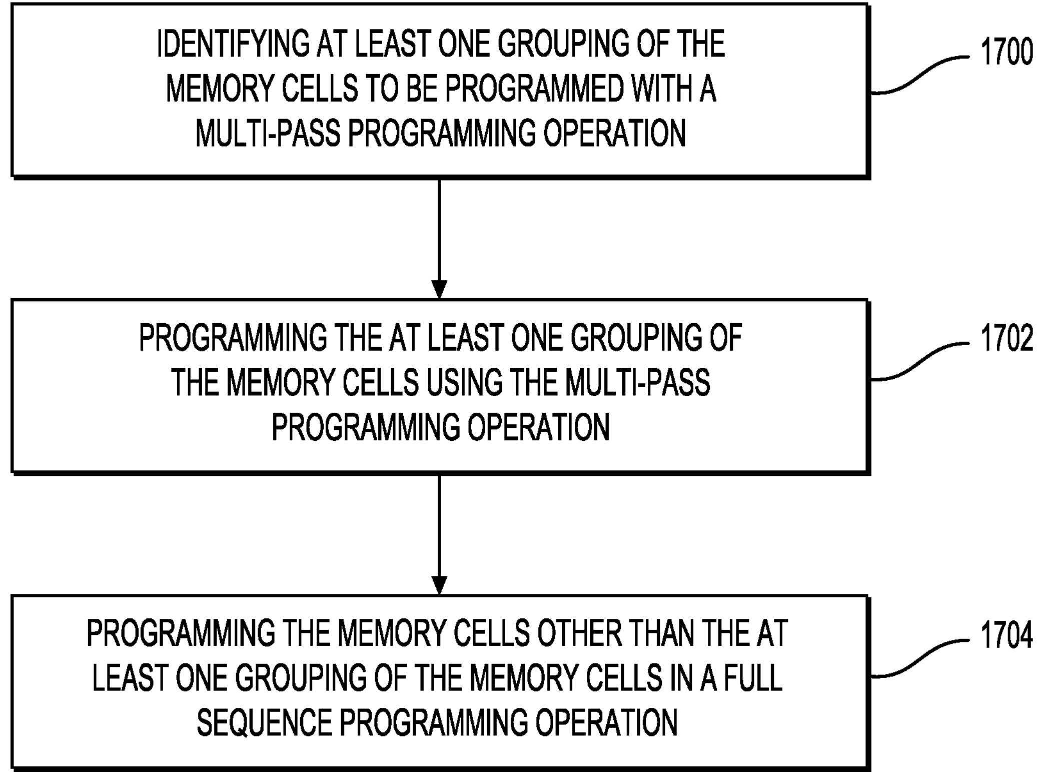
FIGS. 17 and 18 illustrate steps of a method of operating the memory apparatus according to aspects of the disclosure.
Figure 18:
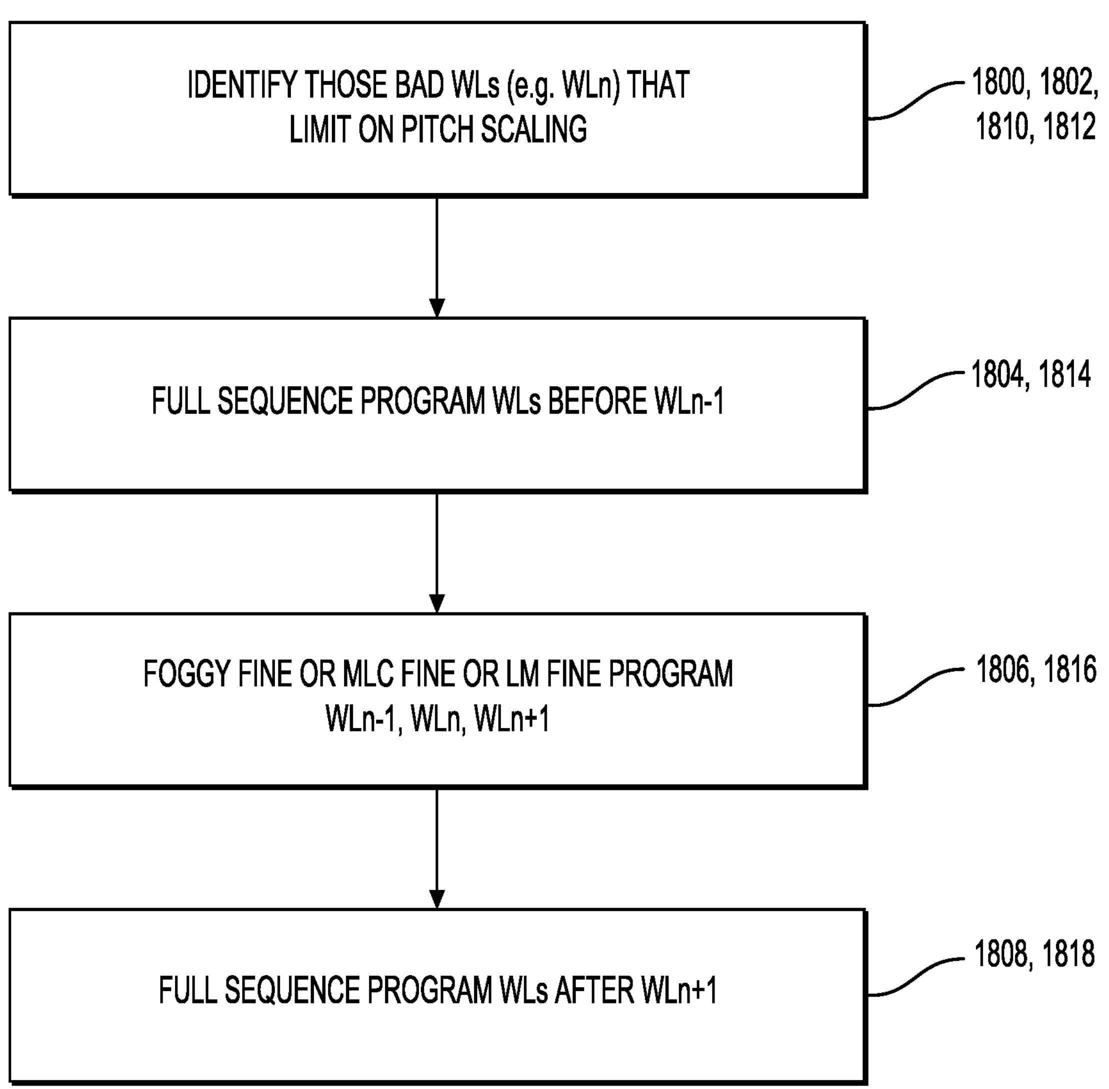

Now referring to FIGS. 17 and 18, a method of operating a memory apparatus is also provided. As discussed above, the memory apparatus (e.g., non-volatile memory system 100 in FIG. 1) including memory cells (e.g., memory cells 423-426 in FIG. 4) each connected to one of a plurality of word lines (e.g., WLL0-WLL22 in FIG. 7C). The memory cells are disposed in memory holes (e.g., memory holes MH0-MH4 of FIG. 7C) and are configured to retain a threshold voltage Vth corresponding to one of a plurality of data states (e.g., "Er", "A", "B", "C" in FIG. 10A). So, referring initially to FIG. 17, the method includes the step of 1700 identifying at least one grouping of the memory cells to be programmed with a multi-pass programming operation. Next, 1702 programming the at least one grouping of the memory cells using the multi-pass programming operation. The method also includes the step of 1704 programming the memory cells other than the at least one grouping of the memory cells in a full sequence programming operation.

Referring back to FIG. 14, the plurality of word lines include the at least one neighboring word line (indicated as WLn+1 and WLn−1 in FIG. 14) immediately adjacent to each of the plurality of word lines identified as bad word lines (indicated as WLn). So, according to an aspect, the at least one grouping of the memory cells to be programmed with a multi-pass programming operation is the memory cells connected to ones of the plurality of word lines identified as the bad word lines and the at least one neighboring word line. Therefore, according to an aspect and referring specifically to FIG. 18, the method further includes the step of 1800 programming and reading the memory cells of each of the plurality of word lines to determine whether a threshold voltage budget for the one of the plurality of word lines is below a predetermined threshold voltage budget, the threshold voltage budget being a summation of a plurality of margins each disposed between ones of the plurality of data states. The method continues with the step of 1802 identifying the plurality of word lines with the threshold voltage budget below the predetermined threshold voltage budget as the bad word lines to be programmed with the multi-pass programming operation. The method proceeds by 1804 programming the memory cells connected to ones of the plurality of word lines before (above or below in the stack depending on the programming sequence) the ones of the plurality of word lines identified as the bad word lines and the at least one neighboring word line in the full sequence programming operation. Next, 1806 programming the ones of the plurality of word lines identified as the bad word lines and the at least one neighboring word line using the multi-pass programming operation. The method continues by 1808 programming the memory cells connected to ones of the plurality of word lines after (above or below in the stack depending on the programming sequence) the ones of the plurality of word lines identified as the bad word lines and the at least one neighboring word line in the full sequence programming operation.

Again, instead of identifying ones of the plurality of word lines as the bad word lines using the threshold voltage budget, threshold voltage margins disposed between ones of the plurality of data states can be used. So, according to an aspect and continuing to refer to FIG. 18, the method further includes the step of 1810 programming and reading the memory cells of each of the plurality of word lines to determine whether threshold voltage margins disposed between ones of the plurality of data states for the one of the plurality of word lines are below a predetermined threshold voltage margin limit. The method continues with the step of 1812 identifying the plurality of word lines with the threshold voltage margins below the predetermined threshold voltage margin limit as the bad word lines to be programmed with the multi-pass programming operation. The method also includes the step of 1814 programming the memory cells connected to ones of the plurality of word lines before (above or below in the stack depending on the programming sequence) the ones of the plurality of word lines identified as the bad word lines and the at least one neighboring word line in the full sequence programming operation. In addition, the method includes the step of 1816 programming the one of the plurality of word lines identified as the bad word lines and the at least one neighboring word line using the multi-pass programming operation. The method additionally includes the step of 1818 programming the memory cells connected to ones of the plurality of word lines after (above or below in the stack depending on the programming sequence) the ones of the plurality of word lines identified as the bad word lines and the at least one neighboring word line in the full sequence programming operation.

Again, as discussed above, the memory cells other than the at least one grouping of the memory cells can be programmed in the full sequence programming operation. Therefore, according to an aspect and with reference back to FIG. 10F, the method can further include the step of programming the memory cells other than the at least one grouping of the memory cells to the plurality of data states targeted for each of the memory cells by applying a plurality of pulses increasing in magnitude by a step amount to the ones of the plurality of word lines connected to the memory cells other than the at least one grouping of the memory cells during each of a plurality of programming loops of the full sequence programming operation.

Again, referring back to FIG. 10A, for example, the plurality of data states include, in order of increasing threshold voltage, an erased state (e.g., “Er” state) and a plurality of programmed data states (e.g., “A”, “B”, “C”). With reference back to FIGS. 10D and 10E, method further includes the step of programming each of the memory cells targeted for one of the plurality of programmed data states to one of a plurality of lower programmed data states corresponding with the one of the plurality of programmed data states targeted (e.g., lower A-state distribution 1012 corresponding to the “A” state) while each of the memory cells targeted for the erased state remains in the erased state in a first programming pass. Each of the plurality of lower programmed data states is associated with the threshold voltage being lower than the corresponding one of the plurality of programmed data states. The method also includes the step of programming each of the memory cells programmed to the plurality of lower programmed data states to corresponding ones of the plurality of programmed data states targeted (e.g., from lower A-state distribution 1012 to distribution 1002 for the “A” state) while each of the memory cells targeted for the erased state remains in the erased state in a second programming pass.

Again, referring back to FIG. 10A, for example, the plurality of data states include, in order of increasing threshold voltage, the erased state (e.g., “Er” state) and a plurality of lower data states (e.g., “A” state) and a plurality of upper data states (e.g., “B” and “C” states). As discussed above and with reference back to FIGS. 10B and 10C, the method further includes the step of programming each of the memory cells targeted for one of the plurality of upper data states to an intermediate state (e.g., “LM” state) while each of the memory cells targeted for one of the plurality of lower data states remains in the erased state in a first programming pass. The method also includes the step of programming each of the memory cells programmed to the intermediate state to the one of the plurality of upper data states targeted and each of the memory cells in the erased state to the one of the plurality of lower data states targeted while each of the memory cells targeted for the erased state remains in the erased state in a second programming pass.

As previously discussed and with reference back to FIG. 7C, for example, the memory cells can be connected in series between a drain-side select gate transistor (e.g., SGD1, SGD2, SGD3 layers) on a drain-side of each of the memory holes and a source-side select gate transistor (e.g., SGS1, SGS2, SGS3 layers) on a source-side of each of the memory holes. The plurality of word lines (e.g., WLL0-WLL22) and a plurality of dielectric layers (e.g., DL0 to DL25) extend horizontally and overlay one another in an alternating fashion in a stack (e.g., stack 776). The memory holes or strings (e.g., NAND strings (e.g., NS0A, NS1A, NS2A, NS3A) extend vertically through the stack and the drain-side select gate transistor of each of the memory holes is connected to one of a plurality of bit lines (e.g., bit line BL0A) and the source-side select gate transistor of each of the memory holes is connected to a source line (source line SL0A). The memory holes are in rows comprising a plurality of strings. The plurality of strings are grouped in a plurality of blocks. As shown, each of the plurality of blocks comprise a plurality of sub-blocks (e.g., SB1 and SB0) arranged vertically in the stack including a lower sub-block (e.g., SB0) adjacent to the source line and an upper sub-block (e.g., SB1) arranged vertically above the lower sub-block. Again, according to an aspect, the at least one grouping of the memory cells to be programmed with the multi-pass programming operation is the memory cells of the upper sub-block. Thus, the method further includes the step of programming the memory cells connected to each of the plurality of word lines associated with the lower sub-block with the full sequence programming operation in a reverse programming order in which the plurality of word lines are programmed beginning with word lines on the drain-side of each of the strings and progressing toward the source-side of each of the strings. The method also includes the step of programming the memory cells connected to each of the plurality of word lines associated with the upper sub-block with the multi-pass programming operation in a normal programming order in which the plurality of word lines are programmed beginning with word lines on the source-side of each of the strings and progressing toward the drain-side of each of the strings.

The memory apparatus and method of operation discussed herein provide numerous advantages including allowing reduced ON pitch scaling by identifying at least one grouping of the memory cells to be programmed with a multi-pass programming operation, programming the at least one grouping of the memory cells using the multi-pass programming operation (e.g. LM-fine, foggy fine, or MLC fine), and programming memory cells other than the at least one grouping of the memory cells in a full sequence or single pass programming operation. Specifically, the memory apparatus and method of operation discussed herein can, for example, apply the multi-pass programming operation on the bad word lines to reduce their threshold voltage Vt budget sensitivity to ON pitch, and keep the full sequence programming operation on other word lines, thereby allowing the reduction in ON pitch scaling.

Clearly, changes may be made to what is described and illustrated herein without, however, departing from the scope defined in the accompanying claims. The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," "top", "bottom", and the like, may be used herein for ease of description to describe one element's or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptions used herein interpreted accordingly.

What is claimed is:

1. A memory apparatus, comprising:

memory cells each connected to a different one of a plurality of word lines and disposed in memory holes and configured to retain a threshold voltage corresponding to one of a plurality of data states; and a control means coupled to the plurality of word lines and the memory holes and configured to:

identify at least one grouping of the memory cells to be programmed with a multi-pass programming operation, program the at least one grouping of the memory cells using the multi-pass programming operation, and program the memory cells other than the at least one grouping of the memory cells in a full sequence programming operation.

2. The memory apparatus as set forth in claim 1, wherein the plurality of word lines include at least one neighboring word lines immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the control means is further configured to:

program and read the memory cells of each of the plurality of word lines to determine whether a threshold voltage budget for the one of the plurality of word lines is below a predetermined threshold voltage budget, the threshold voltage budget being a summation of a plurality of margins each disposed between ones of the plurality of data states;

identify the plurality of word lines with the threshold voltage budget below the predetermined threshold voltage budget as the bad word lines to be programmed with the multi-pass programming operation;

program the memory cells connected to ones of the plurality of word lines before the ones of the plurality of word lines identified as the bad word lines and the at least one neighboring word line in the full sequence programming operation;

program the ones of the plurality of word lines identified as the bad word lines and the at least one neighboring word line using the multi-pass programming operation; and program the memory cells connected to ones of the plurality of word lines after the ones of the plurality of word lines identified as the bad word lines and the at least one neighboring word line in the full sequence programming operation.

3. The memory apparatus as set forth in claim 1, wherein the plurality of word lines include at least one neighboring word line immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the control means is further configured to:

program and read the memory cells of each of the plurality of word lines to determine whether threshold voltage margins disposed between ones of the plurality of data states for the one of the plurality of word lines are below a predetermined threshold voltage margin limit;

identify the plurality of word lines with the threshold voltage margins below the predetermined threshold voltage margin limit as the bad word lines to be programmed with the multi-pass programming operation;

program the memory cells connected to ones of the plurality of word lines before the one of the plurality of word lines identified as the bad word lines and the at least one neighboring word line in the full sequence programming operation;

program the one of the plurality of word lines identified as the bad word lines and the at least one neighboring word line using the multi-pass programming operation; and program the memory cells connected to ones of the plurality of word lines after the one of the plurality of word lines identified as the bad word lines and the at least one neighboring word line in the full sequence programming operation.

4. The memory apparatus as set forth in claim 1, wherein the control means is configured to program the memory cells other than the at least one grouping of the memory cells to the plurality of data states targeted for each of the memory cells by applying a plurality of pulses increasing in magnitude by a step amount to the ones of the plurality of word lines connected to the memory cells other than the at least one grouping of the memory cells during each of a plurality of programming loops of the full sequence programming operation.

5. The memory apparatus as set forth in claim 1, wherein the plurality of data states include, in order of increasing threshold voltage, an erased state and a plurality of programmed data states, and the control means is further configured to:

program each of the memory cells targeted for one of the plurality of programmed data states to one of a plurality of lower programmed data states corresponding with the one of the plurality of programmed data states targeted while each of the memory cells targeted for the erased state remains in the erased state in a first programming pass, each of the plurality of lower programmed data states being associated with the threshold voltage being lower than the corresponding one of the plurality of programmed data states; and program each of the memory cells programmed to the plurality of lower programmed data states to corresponding ones of the plurality of programmed data states targeted while each of the memory cells targeted for the erased state remains in the erased state in a second programming pass.

6. The memory apparatus as set forth in claim 1, wherein the plurality of data states include, in order of increasing threshold voltage, an erased state and a plurality of lower data states and a plurality of upper data states, and the control means is configured to:

program each of the memory cells targeted for one of the plurality of upper data states to an intermediate state while each of the memory cells targeted for one of the plurality of lower data states remains in the erased state in a first programming pass; and program each of the memory cells programmed to the intermediate state to the one of the plurality of upper data states targeted and each of the memory cells in the erased state to the one of the plurality of lower data states targeted while each of the memory cells targeted for the erased state remains in the erased state in a second programming pass.

7. The memory apparatus as set forth in claim 1, wherein the memory cells are connected in series between a drain-side select gate transistor on a drain-side of each of the memory holes and a source-side select gate transistor on a source-side of each of the memory holes, the plurality of word lines and a plurality of dielectric layers extend horizontally and overlay one another in an alternating fashion in a stack, the memory holes extend vertically through the stack, the drain-side select gate transistor of each of the memory holes is connected to one of a plurality of bit lines and the source-side select gate transistor of each of the memory holes is connected to a source line, the memory holes are in rows comprising a plurality of strings, the plurality of strings are grouped in a plurality of blocks, each of the plurality of blocks comprise a plurality of sub-blocks arranged vertically in the stack including a lower sub-block adjacent to the source line and an upper sub-block arranged vertically above the lower sub-block, the at least one grouping of the memory cells to be programmed with the multi-pass programming operation is the memory cells of the upper sub-block and the control means is further configured to:

program the memory cells connected to each of the plurality of word lines associated with the lower sub-block with the full sequence programming operation in a reverse programming order in which the plurality of word lines are programmed beginning with word lines on the drain-side of each of the strings and progressing toward the source-side of each of the strings; and program the memory cells connected to each of the plurality of word lines associated with the upper sub-block with the multi-pass programming operation in a normal programming order in which the plurality of word lines are programmed beginning with word lines on the source-side of each of the strings and progressing toward the drain-side of each of the strings.

8. A controller in communication with a memory apparatus including memory cells each connected to a different one of a plurality of word lines and disposed in memory holes and configured to retain a threshold voltage corresponding to one of a plurality of data states, the controller configured to:

instruct the memory apparatus to identify at least one grouping of the memory cells to be programmed with a multi-pass programming operation;

instruct the memory apparatus to program the at least one grouping of the memory cells using the multi-pass programming operation; and instruct the memory apparatus to program the memory cells other than the at least one grouping of the memory cells in a full sequence programming operation.

9. The controller as set forth in claim 8, wherein the plurality of word lines include at least one neighboring word line immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the controller is further configured to:

instruct the memory apparatus to program and read the memory cells of each of the plurality of word lines to determine whether a threshold voltage budget for the one of the plurality of word lines is below a predetermined threshold voltage budget, the threshold voltage budget being a summation of a plurality of margins each disposed between ones of the plurality of data states;

instruct the memory apparatus to identify the plurality of word lines with the threshold voltage budget below the predetermined threshold voltage budget as the bad word lines to be programmed with the multi-pass programming operation;

instruct the memory apparatus to program the memory cells connected to ones of the plurality of word lines before the ones of the plurality of word lines identified as the bad word lines and the at least one neighboring word line in the full sequence programming operation;

instruct the memory apparatus to program the ones of the plurality of word lines identified as the bad word lines and the at least one neighboring word line using the multi-pass programming operation; and instruct the memory apparatus to program the memory cells connected to ones of the plurality of word lines after the ones of the plurality of word lines identified as the bad word lines and the at least one neighboring word line in the full sequence programming operation.

10. The controller as set forth in claim 8, wherein the plurality of word lines include at least one neighboring word line immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the controller is further configured to:

instruct the memory apparatus to program and read the memory cells of each of the plurality of word lines to determine whether threshold voltage margins disposed between ones of the plurality of data states for the one of the plurality of word lines are below a predetermined threshold voltage margin limit;

instruct the memory apparatus to identify the plurality of word lines with the threshold voltage margins below the predetermined threshold voltage margin limit as the bad word lines to be programmed with the multi-pass programming operation;

instruct the memory apparatus to program the memory cells connected to ones of the plurality of word lines before the one of the plurality of word lines identified as the bad word lines and the at least one neighboring word line in the full sequence programming operation;

instruct the memory apparatus to program the one of the plurality of word lines identified as the bad word lines and the at least one neighboring word line using the multi-pass programming operation; and instruct the memory apparatus to program the memory cells connected to ones of the plurality of word lines after the one of the plurality of word lines identified as the bad word lines and the at least one neighboring word line in the full sequence programming operation.

11. The controller as set forth in claim 8, wherein the plurality of data states include, in order of increasing threshold voltage, an erased state and a plurality of programmed data states, and the controller is further configured to:

instruct the memory apparatus to program each of the memory cells targeted for one of the plurality of programmed data states to one of a plurality of lower programmed data states corresponding with the one of the plurality of programmed data states targeted while each of the memory cells targeted for the erased state remains in the erased state in a first programming pass, each of the plurality of lower programmed data states being associated with the threshold voltage being lower than the corresponding one of the plurality of programmed data states; and instruct the memory apparatus to program each of the memory cells programmed to the plurality of lower programmed data states to corresponding ones of the plurality of programmed data states targeted while each of the memory cells targeted for the erased state remains in the erased state in a second programming pass.

12. The controller as set forth in claim 8, wherein the plurality of data states include, in order of increasing threshold voltage, an erased state and a plurality of lower data states and a plurality of upper data states, and the controller is configured to:

instruct the memory apparatus to program each of the memory cells targeted for one of the plurality of upper data states to an intermediate state while each of the memory cells targeted for one of the plurality of lower data states remains in the erased state in a first programming pass; and instruct the memory apparatus to program each of the memory cells programmed to the intermediate state to the one of the plurality of upper data states targeted and each of the memory cells in the erased state to the one of the plurality of lower data states targeted while each of the memory cells targeted for the erased state remains in the erased state in a second programming pass.

13. The controller as set forth in claim 8, wherein the memory cells are connected in series between a drain-side select gate transistor on a drain-side of each of the memory holes and a source-side select gate transistor on a source-side of each of the memory holes, the plurality of word lines and a plurality of dielectric layers extend horizontally and overlay one another in an alternating fashion in a stack, the memory holes extend vertically through the stack, the drain-side select gate transistor of each of the memory holes is connected to one of a plurality of bit lines and the source-side select gate transistor of each of the memory holes is connected to a source line, the memory holes are in rows comprising a plurality of strings, the plurality of strings are grouped in a plurality of blocks, each of the plurality of blocks comprise a plurality of sub-blocks arranged vertically in the stack including a lower sub-block adjacent to the source line and an upper sub-block arranged vertically above the lower sub-block, the at least one grouping of the memory cells to be programmed with the multi-pass programming operation is the memory cells of the upper sub-block and the controller is further configured to:

instruct the memory apparatus to program the memory cells connected to each of the plurality of word lines associated with the lower sub-block with the full sequence programming operation in a reverse programming order in which the plurality of word lines are programmed beginning with word lines on the drain-side of each of the strings and progressing toward the source-side of each of the strings; and instruct the memory apparatus to program the memory cells connected to each of the plurality of word lines associated with the upper sub-block with the multi-pass programming operation in a normal programming order in which the plurality of word lines are programmed beginning with word lines on the source-side of each of the strings and progressing toward the drain-side of each of the strings.

14. A method of operating a memory apparatus including memory cells each connected to a different one of a plurality of word lines and disposed in memory holes and configured to retain a threshold voltage corresponding to one of a plurality of data states, the method comprising the steps of:

identifying at least one grouping of the memory cells to be programmed with a multi-pass programming operation;

programming the at least one grouping of the memory cells using the multi-pass programming operation; and programming the memory cells other than the at least one grouping of the memory cells in a full sequence programming operation.

15. The method as set forth in claim 14, wherein the plurality of word lines include at least one neighboring word line immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the method further includes the steps of:

programming and reading the memory cells of each of the plurality of word lines to determine whether a threshold voltage budget for the one of the plurality of word lines is below a predetermined threshold voltage budget, the threshold voltage budget being a summation of a plurality of margins each disposed between ones of the plurality of data states;

identifying the plurality of word lines with the threshold voltage budget below the predetermined threshold voltage budget as the bad word lines to be programmed with the multi-pass programming operation;

programming the memory cells connected to ones of the plurality of word lines before the ones of the plurality of word lines identified as the bad word lines and the at least one neighboring word line in the full sequence programming operation;

programming the ones of the plurality of word lines identified as the bad word lines and the at least one neighboring word line using the multi-pass programming operation; and programming the memory cells connected to ones of the plurality of word lines after the ones of the plurality of word lines identified as the bad word lines and the at least one neighboring word line in the full sequence programming operation.

16. The method as set forth in claim 14, wherein the plurality of word lines include at least one neighboring word line immediately adjacent to each of the plurality of word lines identified as bad word lines, the at least one grouping of the memory cells to be programmed with a multi-pass programming operation is the memory cells connected to ones of the plurality of word lines identified as the bad word lines and the at least one neighboring word line, and the method further includes the steps of:

programming and reading the memory cells of each of the plurality of word lines to determine whether threshold voltage margins disposed between ones of the plurality of data states for the one of the plurality of word lines are below a predetermined threshold voltage margin limit;

identifying the plurality of word lines with the threshold voltage margins below the predetermined threshold voltage margin limit as the bad word lines to be programmed with the multi-pass programming operation;

programming the memory cells connected to ones of the plurality of word lines before the ones of the plurality of word lines identified as the bad word lines and the at least one neighboring word line in the full sequence programming operation;

programming the one of the plurality of word lines identified as the bad word lines and the at least one neighboring word line using the multi-pass programming operation; and programming the memory cells connected to ones of the plurality of word lines after the ones of the plurality of word lines identified as the bad word lines and the at least one neighboring word line in the full sequence programming operation.

17. The method as set forth in claim 14, wherein the method further includes the step of programming the memory cells other than the at least one grouping of the memory cells to the plurality of data states targeted for each of the memory cells by applying a plurality of pulses increasing in magnitude by a step amount to the ones of the plurality of word lines connected to the memory cells other than the at least one grouping of the memory cells during each of a plurality of programming loops of the full sequence programming operation.

18. The method as set forth in claim 14, wherein the plurality of data states include, in order of increasing threshold voltage, an erased state and a plurality of programmed data states, and the method further includes the steps of:

programming each of the memory cells targeted for one of the plurality of programmed data states to one of a plurality of lower programmed data states corresponding with the one of the plurality of programmed data states targeted while each of the memory cells targeted for the erased state remains in the erased state in a first programming pass, each of the plurality of lower programmed data states being associated with the threshold voltage being lower than the corresponding one of the plurality of programmed data states; and programming each of the memory cells programmed to the plurality of lower programmed data states to corresponding ones of the plurality of programmed data states targeted while each of the memory cells targeted for the erased state remains in the erased state in a second programming pass.

19. The method as set forth in claim 14, wherein the plurality of data states include, in order of increasing threshold voltage, an erased state and a plurality of lower data states and a plurality of upper data states, and the method further includes the steps of:

programming each of the memory cells targeted for one of the plurality of upper data states to an intermediate state while each of the memory cells targeted for one of the plurality of lower data states remains in the erased state in a first programming pass; and programming each of the memory cells programmed to the intermediate state to the one of the plurality of upper data states targeted and each of the memory cells in the erased state to the one of the plurality of lower data states targeted while each of the memory cells targeted for the erased state remains in the erased state in a second programming pass.

20. The method as set forth in claim 14, wherein the memory cells are connected in series between a drain-side select gate transistor on a drain-side of each of the memory holes and a source-side select gate transistor on a source-side of each of the memory holes, the plurality of word lines and a plurality of dielectric layers extend horizontally and overlay one another in an alternating fashion in a stack, the memory holes extend vertically through the stack, the drain-side select gate transistor of each of the memory holes is connected to one of a plurality of bit lines and the source-side select gate transistor of each of the memory holes is connected to a source line, the memory holes are in rows comprising a plurality of strings, the plurality of strings are grouped in a plurality of blocks, each of the plurality of blocks comprise a plurality of sub-blocks arranged vertically in the stack including a lower sub-block adjacent to the source line and an upper sub-block arranged vertically above the lower sub-block, the at least one grouping of the memory cells to be programmed with the multi-pass programming operation is the memory cells of the upper sub-block and the method further includes the steps of:

programming the memory cells connected to each of the plurality of word lines associated with the lower sub-block with the full sequence programming operation in a reverse programming order in which the plurality of word lines are programmed beginning with word lines on the drain-side of each of the strings and progressing toward the source-side of each of the strings; and programming the memory cells connected to each of the plurality of word lines associated with the upper sub-block with the multi-pass programming operation in a normal programming order in which the plurality of word lines are programmed beginning with word lines on the source-side of each of the strings and progressing toward the drain-side of each of the strings.

* * * * *